United States Patent
Kooijman et al.

(10) Patent No.: US 12,465,293 B2
(45) Date of Patent: Nov. 11, 2025

(54) IDENTIFYING A BODY PART

(71) Applicant: KONINKLIJKE PHILIPS N.V., Eindhoven (NL)

(72) Inventors: Gerben Kooijman, Leende (NL); Felipe Maia Masculo, Eindhoven (NL); Adrienne Heinrich, Taguig (PH); Shakith Devinda Fernando, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 791 days.

(21) Appl. No.: 17/633,227

(22) PCT Filed: Aug. 17, 2020

(86) PCT No.: PCT/EP2020/072985
§ 371 (c)(1),
(2) Date: Feb. 7, 2022

(87) PCT Pub. No.: WO2021/032670
PCT Pub. Date: Feb. 25, 2021

(65) Prior Publication Data
US 2022/0280119 A1      Sep. 8, 2022

(30) Foreign Application Priority Data

Aug. 20, 2019   (EP) .................................... 19192688

(51) Int. Cl.
*A61B 5/00*       (2006.01)
*A61B 8/00*       (2006.01)

(52) U.S. Cl.
CPC ............ *A61B 5/7267* (2013.01); *A61B 5/441* (2013.01); *A61B 5/6843* (2013.01);
(Continued)

(58) Field of Classification Search
CPC ....... A61B 5/7267; A61B 5/441; A61B 5/443; A61B 5/6843; A61B 5/6844; A61B 8/429;
(Continued)

(56) References Cited

U.S. PATENT DOCUMENTS 6,459,973  B1   10/2002  Breed
2012/0307032 A1   12/2012  Gomi
(Continued)

FOREIGN PATENT DOCUMENTS

JP         0643897 A    2/1994
JP         06309464 A   11/1994
(Continued)

OTHER PUBLICATIONS

International Search Report and Written Opinion Dated Oct. 29, 2020 for International Application No. PCT/EP2020/072985 Filed Aug. 17, 2020.
(Continued)

*Primary Examiner* — Eric F Winakur
*Assistant Examiner* — Sienna C Pyle

(57) ABSTRACT

A computer-implemented method of identifying a subject's body part on which a hand-held device is used to perform a personal care operation. The hand-held device comprises a head portion for contacting the subject's skin one or more sensors for measuring a parameter and generating measurement signals as the hand-held device is used on the subject's skin. The sensor(s) comprise(s) at least one of a skin contact sensor, skin tone sensor, and/or proximity sensor. The method includes obtaining a measurement signal from each sensor; analyzing the obtained measurement signal using a trained machine learning model (MLM) to identify the subject's body part that the hand-held device is used on. The trained MLM analyzes a plurality of measurements in a time
(Continued)

window on each of the obtained measurement signals to identify the body part. An indication of the identified body part is then outputted.

15 Claims, 20 Drawing Sheets

(52) U.S. Cl.
CPC .......... *A61B 5/6844* (2013.01); *A61B 8/4227* (2013.01); *A61B 8/429* (2013.01)

(58) Field of Classification Search
CPC ........ A61B 5/077; A61B 5/103; G16H 30/20; G06T 2207/30088; G06T 2207/30201
See application file for complete search history.

(56) References Cited

U.S. PATENT DOCUMENTS

| | | | |
|---|---|---|---|
| 2013/0103017 A1* | 4/2013 | Weckwerth | A61N 5/0616 606/9 |
| 2018/0014777 A1* | 1/2018 | Amir | A61M 35/003 |
| 2018/0263542 A1* | 9/2018 | Cronin | A61B 5/14551 |
| 2020/0268252 A1* | 8/2020 | Litvinova | G01J 3/4406 |
| 2021/0010800 A1 | 1/2021 | Edwards | |
| 2021/0361233 A1* | 11/2021 | Wilson | H05K 5/03 |

FOREIGN PATENT DOCUMENTS

| | | |
|---|---|---|
| JP | 2007330551 A | 12/2007 |
| JP | 2012249917 A | 12/2012 |
| JP | 2015037547 A | 2/2015 |
| JP | 2017169884 A | 9/2017 |
| WO | 2018/149738 A1 | 8/2018 |
| WO | 2018/167073 A1 | 9/2018 |

OTHER PUBLICATIONS

Moench, et al: "VCSEL-based sensors for distance and velocity", Proceedings vol. 9766, Vertical-Cavity Surface-Emitting Lasers XX; 97660A (2016).

Pruijmboom, et al: "VCSEL-based miniature laser-self-mixing interferometer with integrated optical and electronic components", Proceedings of SPIE—The International Society for Optical Engineering, Feb. 2008.

* cited by examiner

IDENTIFYING A BODY PART

CROSS REFERENCE TO RELATED APPLICATIONS

This application is the U.S. National Phase application under 35 U.S.C. § 371 of International Application No. PCT/EP2020/072985 filed Aug. 17, 2020, which claims the benefit of European Patent Application Number 19192688.0 filed Aug. 20, 2019. These applications are hereby incorporated by reference herein.

FIELD OF THE INVENTION

This disclosure relates to a hand-held device that is for performing a personal care operation on a subject, and in particular relates to a technique for identifying a body part of the subject on which the hand-held device is used.

BACKGROUND OF THE INVENTION

Many types of hand-held device are available that can be used on a body part of a subject to provide a personal care operation on the body. For example, there are hand-held devices for the removal of unwanted hairs using various techniques such as shaving, electrolysis, plucking, laser and light therapies (known as photoepilation or Intense Pulsed Light, IPL) and injection of therapeutic anti-androgens. Other types of dermatological operations, including hair growth reduction and treating acne, can also use light-based technologies. Hand-held devices can also be used for providing a massage to the subject, for providing a nail treatment, for providing physiotherapy, for applying patches to the subject (e.g. electrocardiogram electrodes, etc.). Another type of hand-held device that can be used on a body part is an ultrasound probe.

An IPL treatment is characterized by the user of the IPL device treating relatively small areas of the skin for the purpose of hair removal. The IPL treatment uses intense light to heat melanin in hair and hair roots, which puts the hair follicles into a resting phase, preventing hair re-growth. This effect is only of limited duration and therefore treatment has to be repeated on a regular basis: typically once every 4 to 8 weeks in the maintenance phase after an initial period of about two months in which treatment is performed once every two weeks.

An IPL treatment device can use different light intensity settings to accommodate different skin tone and hair color combinations. Some existing IPL treatment devices, for example the Philips Lumea, can include a skin tone sensor for measuring skin tone, and the measured skin tone can be used to set/recommend the safest light intensity setting. Furthermore, different parts of the body can require different treatment characteristics. In some cases this can be dealt with by providing and using different attachments for the IPL treatment device for use with different body parts, e.g. for the face and bikini area, but it is desirable for the part of the body that the IPL treatment device is being used on (and/or has been used on) to be determined.

This information on the body part is also useful in the general case of a hand-held device for performing a personal care operation, and the information can be used not only for adjusting the operation of the hand-held device, but also for guiding the user of the hand-held device to perform the personal care operation on an appropriate body part or part of a body part, providing a summary or report of the personal care operation performed on the subject, scheduling retreatment of a body part and providing personalised content to the user or subject.

Therefore, there is a need for improvements in identifying a body part that a hand-held device is being used on.

SUMMARY OF THE INVENTION

According to a first specific aspect, there is provided a computer-implemented method of identifying a body part of a subject on which a hand-held device is used. The hand-held device is for performing a personal care operation on the subject and the hand-held device comprises a head portion for contacting skin of the subject during the personal care operation. The hand-held device further comprises one or more sensors for measuring a respective parameter and generating respective measurement signals as the hand-held device is used on the skin of the subject. The one or more sensors comprises at least one of: (a) a skin contact sensor, and the parameter measured by the skin contact sensor is indicative of whether the head portion is in contact with skin, (b) a skin tone sensor, and the parameter measured by the skin tone sensor is indicative of a skin tone of skin that the head portion is in contact with, or indicative of a skin tone of skin that is adjacent to the skin that the head portion is in contact with, and (c) a proximity sensor, and the parameter measured by the proximity sensor is indicative of a distance from the proximity sensor to skin adjacent to the skin that the head portion is in contact with. The method comprises: obtaining a respective measurement signal from each of the one or more sensors, each measurement signal comprising a time-series of measurements of the respective parameter as the hand-held device is used on the skin of the subject; analysing the obtained one or more measurement signals using a trained machine learning model, MLM, to identify the body part of the subject that the hand-held device is used on, wherein the trained MLM analyses a plurality of measurements in a time window on each of the obtained one or more measurement signals to identify the body part; and outputting an indication of the identified body part. Thus the first aspect provides improvements in the identification of body parts through the use of a trained MLM that is able to identify the body part based on measurement signals from one or more of a skin contact sensor, a skin tone sensor and a proximity sensor. By analysing a plurality of measurements in a time window on each of the obtained one or more measurement signals to identify the body part, the MLM is enabled to take into account temporal information in the measurement signals.

In some embodiments, the trained MLM is a logistic regression model, a support vector machine, a random forest, a Naïve Bayes classifier, a nearest neighbour classifier, a decision tree classifier, an artificial neural network, or any combination thereof.

In some embodiments, the trained MLM analyses a measurement in each of the obtained one or more measurement signals to identify the body part corresponding to said measurements. These embodiments provide that the MLM provides an identity of the body part for each measurement sample in the measurement signals.

In these embodiments, the method can further comprise repeating the step of analysing for a subsequent measurement in each of the obtained one or more measurement signals to identify the body part corresponding to said subsequent measurements. These embodiments provide that a body part can be identified continuously during the course of a personal care operation.

In an embodiment, the method can further comprise determining respective values of one or more features for the plurality of measurements in the time window on each of the obtained one or more measurement signals; and the trained MLM can analyse the determined respective values to identify the body part.

In this embodiment, the method can further comprise: moving the time window across the obtained one or more measurement signals to provide subsequent pluralities of measurements; and repeating the step of analysing using the subsequent pluralities of measurements to identify the body part corresponding to said subsequent pluralities of measurements. These embodiments provide that a body part can be identified continuously during the course of a personal care operation.

In some embodiments, the method further comprises: repeating the step of analysing on subsequent measurements in the one or more measurement signals to provide a series of outputs indicating an identified body part; and applying a filter to the series of outputs to determine a final output indicating the body part that the hand-held device was used on. These embodiments provide the benefit that spurious body part identifications can be 'smoothed out' of the output of the MLM.

In some embodiments, the method further comprises receiving confirmation from a user on a body part of the subject on which the hand-held device is used during a first time period; and updating the trained MLM based on the received confirmation and the part of the obtained one or more measurement signals corresponding to the first time period. These embodiments provide that the MLM can be refined to improve the detection accuracy. These embodiments also provide that the MLM can be customised or calibrated to the shape of the body parts of the subject.

In some embodiments, the head portion of the hand-held device is selected from a set of removable head portions, where each head portion in the set is for use with a respective body part or respective body parts, and the method further comprises obtaining an indication of the removable head portion used on the hand-held device during the personal care operation, and the trained MLM further analyses the obtained indication with the obtained one or more measurement signals to identify the body part of the subject that the hand-held device is used on. These embodiments improve the accuracy of the body part identification by the MLM making use of the information about the body part(s) that are to be treated using the removable head portion that is in use on the hand-held device.

In some embodiments, the one or more sensors comprises a skin contact sensor and at least one of a skin tone sensor and a proximity sensor, and the step of analysing comprises: analysing the measurement signal from the skin contact sensor to identify a contact time period in which the hand-held device is in contact with the skin; and analysing the obtained one or more measurement signals from the at least one of the skin tone sensor and the proximity sensor for the identified contact time period using the trained MLM to identify the body part of the subject that the hand-held device is used on in the identified contact time period. These embodiments make use of the assumption that the hand-held device is maintained in contact with the skin while operating on a particular body part, with contact being broken when the hand-held device is repositioned on a different body part.

In these embodiments the step of analysing the measurement signal from the skin contact sensor can comprise identifying the contact time period as a time period in which the hand-held device is in continuous contact with the skin.

Alternatively, in these embodiments the step of analysing the measurement signal from the skin contact sensor can comprise identifying the contact time period as spanning multiple time periods in each of which the hand-held device is in continuous contact with the skin, and the multiple time periods are less than a threshold amount of time apart. These embodiments have the advantage that small periods of time where skin contact is lost are permitted.

In some embodiments, the one or more sensors comprises at least one skin contact sensor and a skin tone sensor.

In alternative embodiments, the one or more sensors comprises at least one skin contact sensor, a skin tone sensor and one or more proximity sensors.

In some embodiments, the one or more sensors comprises at least a plurality of proximity sensors, and the plurality of proximity sensors are arranged in the hand-held device such that each proximity sensor measures a parameter indicative of the distance from the proximity sensor to a respective part of the skin adjacent to the skin that the head portion is in contact with.

In some embodiments, the skin contact sensor is a capacitive sensor, the skin tone sensor is an optical sensor, and the proximity sensor is a light and/or sound based proximity sensor.

In some embodiments, the proximity sensor comprises a vertical-cavity surface-emitting laser (VCSEL) sensor.

In some embodiments, the body part of the subject is any of a foot, a leg, a lower leg, a leg, an upper leg, abdomen, torso, chest, back, a hand, an arm, a lower arm, an upper arm, an armpit, a shoulder, neck, face, upper lip, scalp, or head.

According to a second aspect, there is provided a computer program product comprising a computer readable medium having computer readable code embodied therein, the computer readable code being configured such that, on execution by a suitable computer or processor, the computer or processor is caused to perform the method according to the first aspect or any embodiment thereof.

According to a third specific aspect, there is provided a system comprising a hand-held device for performing a personal care operation on a subject and an apparatus for identifying a body part of the subject on which the hand-held device is used. The hand-held device comprises a head portion for contacting skin of the subject during the personal care operation. The hand-held device further comprises one or more sensors for measuring a respective parameter and generating respective measurement signals as the hand-held device is used on the skin of the subject. The one or more sensors comprises at least one of: (a) a skin contact sensor, and the parameter measured by the skin contact sensor is indicative of whether the head portion is in contact with skin, (b) a skin tone sensor, and the parameter measured by the skin tone sensor is indicative of a skin tone of skin that the head portion is in contact with, or indicative of a skin tone of skin that is adjacent to the skin that the head portion is in contact with, and (c) a proximity sensor, and the parameter measured by the proximity sensor is indicative of a distance from the proximity sensor to skin adjacent to the skin that the head portion is in contact with. The apparatus comprises a processing unit configured to: obtain a respective measurement signal from each of the one or more sensors, each measurement signal comprising a time-series of measurements of the respective parameter as the hand-held device is used on the skin of the subject; analyse the obtained one or more measurement signals using a trained machine learning model, MLM, to identify the body part of the subject that the hand-held device is used on, wherein the trained MLM is configured to analyse a plurality of measurements in a time window on each of the obtained one or more measurement signals to identify the body part; and output an indication of the identified body part. Thus the third aspect provides improvements in the identification of body parts through the use of a trained MLM that is able to identify the body part based on measurement signals from one or more of a skin contact sensor, a skin tone sensor and a proximity sensor. Because the trained MLM is configured to analyse a plurality of measurements in a time window on each of the obtained one or more measurement signals to identify the body part, the MLM is enabled to take into account temporal information in the measurement signals.

In some embodiments, the trained MLM is a logistic regression model, a support vector machine, a random forest, a Naïve Bayes classifier, a nearest neighbour classifier, a decision tree classifier, an artificial neural network, or any combination thereof.

In some embodiments, the processing unit is configured to analyse a measurement in each of the obtained one or more measurement signals using the MLM to identify the body part corresponding to said measurements. These embodiments provide that the MLM provides an identity of the body part for each measurement sample in the measurement signals.

In these embodiments, the processing unit can be further configured to repeat the analysis for a subsequent measurement in each of the obtained one or more measurement signals to identify the body part corresponding to said subsequent measurements. These embodiments provide that a body part can be identified continuously during the course of a personal care operation.

In an embodiment, the processing unit can be further configured to determine respective values of one or more features for the plurality of measurements in the time window on each of the obtained one or more measurement signals; and the processing unit can be configured to analyse the determined respective values using the MLM to identify the body part.

In this embodiment, the processing unit can be further configured to: move the time window across the obtained one or more measurement signals to provide subsequent pluralities of measurements; and repeat the analysis using the subsequent pluralities of measurements to identify the body part corresponding to said subsequent pluralities of measurements. These embodiments provide that a body part can be identified continuously during the course of a personal care operation.

In some embodiments, the processing unit is further configured to: repeat the analysis on subsequent measurements in the one or more measurement signals to provide a series of outputs indicating an identified body part; and apply a filter to the series of outputs to determine a final output indicating the body part that the hand-held device was used on. These embodiments provide the benefit that spurious body part identifications can be 'smoothed out' of the output of the MLM.

In some embodiments, the processing unit is further configured to receive confirmation from a user on a body part of the subject on which the hand-held device is used during a first time period; and update the trained MLM based on the received confirmation and the part of the obtained one or more measurement signals corresponding to the first time period. These embodiments provide that the MLM can be refined to improve the detection accuracy. These embodiments also provide that the MLM can be customised or calibrated to the shape of the body parts of the subject.

In some embodiments, the head portion of the hand-held device is selected from a set of removable head portions, where each head portion in the set is for use with a respective body part or respective body parts, and the processing unit is further configured to obtain an indication of the removable head portion used on the hand-held device during the personal care operation, and analyse the obtained indication using the MLM with the obtained one or more measurement signals to identify the body part of the subject that the hand-held device is used on. These embodiments improve the accuracy of the body part identification by the MLM making use of the information about the body part(s) that are to be treated using the removable head portion that is in use on the hand-held device.

In some embodiments, the one or more sensors comprises a skin contact sensor and at least one of a skin tone sensor and a proximity sensor, and the processing unit is configured to analyse the measurement signal from the skin contact sensor to identify a contact time period in which the hand-held device is in contact with the skin; and analyse the obtained one or more measurement signals from the at least one of the skin tone sensor and the proximity sensor for the identified contact time period using the trained MLM to identify the body part of the subject that the hand-held device is used on in the identified contact time period. These embodiments make use of the assumption that the hand-held device is maintained in contact with the skin while operating on a particular body part, with contact being broken when the hand-held device is repositioned on a different body part.

In these embodiments the processing unit can be configured to analyse the measurement signal from the skin contact sensor to identify the contact time period as a time period in which the hand-held device is in continuous contact with the skin.

Alternatively, in these embodiments the processing unit can be configured to analyse the measurement signal from the skin contact sensor to identify the contact time period as spanning multiple time periods in each of which the hand-held device is in continuous contact with the skin, and the multiple time periods are less than a threshold amount of time apart. These embodiments have the advantage that small periods of time where skin contact is lost are permitted.

In some embodiments, the one or more sensors comprises at least one skin contact sensor and a skin tone sensor.

In alternative embodiments, the one or more sensors comprises at least one skin contact sensor, a skin tone sensor and one or more proximity sensors.

In some embodiments, the one or more sensors comprises at least a plurality of proximity sensors, and the plurality of proximity sensors are arranged in the hand-held device such that each proximity sensor measures a parameter indicative of the distance from the proximity sensor to a respective part of the skin adjacent to the skin that the head portion is in contact with.

In some embodiments, the skin contact sensor is a capacitive sensor, the skin tone sensor is an optical sensor, and the proximity sensor is a light and/or sound based proximity sensor.

In some embodiments, the proximity sensor comprises a vertical-cavity surface-emitting laser (VCSEL) sensor.

In some embodiments, the body part of the subject is any of a foot, a leg, a lower leg, a leg, an upper leg, abdomen, torso, chest, back, a hand, an arm, a lower arm, an upper arm, an armpit, a shoulder, neck, face, upper lip, scalp, or head.

In some embodiments, the apparatus is part of, or otherwise comprised in, the hand-held device. In alternative embodiments, the apparatus is separate from the hand-held device.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

As noted above, the techniques described herein can be used to identify a body part that a hand-held device is being used on, and/or has been used on during a personal care operation. The techniques can be implemented by the hand-held device (e.g. by a processing unit in the hand-held device), or implemented by a processing unit in a separate apparatus. The hand-held device includes one or more sensors that measure respective parameters and that generate respective measurement signals, and those measurement signal(s) are analysed using a machine learning model (MLM) to identify the body part that the hand-held device is being used on.

Figure 1:
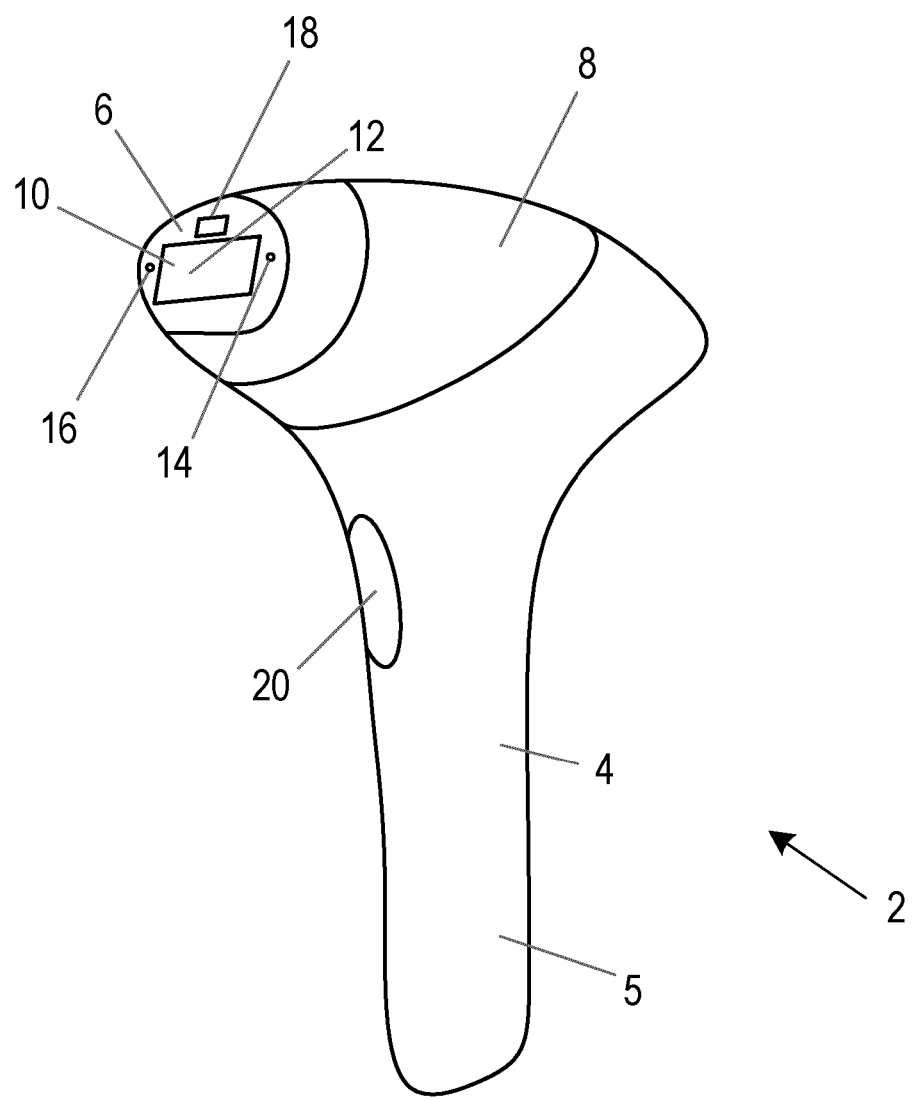
FIG. 1 is an illustration of an exemplary hand-held device comprising skin contact sensors and a skin tone sensor.

FIG. 1 is an illustration of an exemplary hand-held device 2 according to certain embodiments that includes skin contact sensors and a skin tone sensor. The handheld device 2 is for use on a body of a subject (e.g. a person or an animal), and is to be held in one or both hands of a user during use. The hand-held device 2 is to perform some personal care operation on the body of the subject when the hand-held device 2 is in contact with a body part of the subject. In some embodiments, the hand-held device 2 is to perform some personal care operation to the skin of the subject. Some exemplary personal care operations include, but are not limited to, the removal of unwanted hairs by any of shaving, electrolysis, plucking, laser and light therapies (known as photoepilation or Intense Pulsed Light, IPL) and injection of therapeutic anti-androgens; a dermatological (skin) treatment, including hair growth reduction, treating acne, a phototherapy treatment, skin rejuvenation, skin tightening, or port-wine stain treatment; pain relief; providing a massage; providing a nail treatment; and providing physiotherapy. The hand-held device 2 could alternatively be for applying patches to the body of the subject (e.g. electrocardiogram (ECG) electrodes, etc.), or the hand-held device 2 could be for performing an ultrasound scan on the body part.

As described herein, the hand-held device 2 is operated or used by a 'user', and the hand-held device 2 is used on a body of a 'subject'. In some cases the user and the subject is the same person, i.e. the hand-held device 2 is held in a hand and used by a user on themselves (e.g. used on the skin on their leg). In other cases the user and the subject are different people, e.g. the hand-held device 2 is held in a hand and used by a user on someone else.

The hand-held device 2 comprises a housing 4 that includes at least a handle portion 5 and a head portion 6. The handle portion 5 is shaped to enable the user to hold the hand-held device 2 with one hand. The head portion 6 is at a head end 8 of the housing 4, and the head portion 6 is to be placed into contact with the subject in order for the personal care operation to be performed on the body or skin of the subject at the position that the head portion 6 is in contact with the body or skin.

In the embodiment illustrated in FIG. 1, the hand-held device 2 is for performing a personal care operation using energy or energy pulses (e.g. light or light pulses). Thus, in FIG. 1 the head portion 6 comprises an aperture 10 is arranged in or on the housing 4 so that the aperture 10 can be placed adjacent to or on (i.e. in contact with) the skin of the subject. The hand-held device 2 includes one or more energy sources 12 that are for generating energy pulses that are to be applied to the skin of the subject via the aperture 10 and effect a personal care operation. The one or more energy sources 12 are arranged in the housing 4 so that the energy pulses are provided from the one or more energy sources 12 through the aperture 10. The aperture 10 may be in the form of an opening at the head end 8 of the housing 4, or it may be in the form of a window (including a waveguide) that is transparent or semi-transparent to the energy pulses (i.e. the energy pulses can pass through the window).

In the exemplary embodiment shown in FIG. 1, the aperture 10 has a generally rectangular shape, which results in a generally rectangular-shaped skin treatment region on the skin. It will be appreciated that the aperture 10 can have any other desired shape. For example the aperture 10 can be square, elliptical, circular, or any other polygonal shape.

The one or more energy sources 12 can generate any suitable type of energy for performing a personal care operation, for example light, sound, radio frequency (RF) signals, microwave radiation and plasma. In the case of an energy source 12 that generates light, the energy source 12 can be configured to generate a light pulse at any suitable or desired wavelength (or range of wavelengths) and/or intensities. For example, the energy source 12 can generate visible light, infra-red (IR) light and/or ultraviolet (UV) light. Each energy source 12 can comprise any suitable type of light source, such as one or more light emitting diodes (LEDs), a (Xenon) flash lamp, a laser or lasers, etc. In a preferred embodiment, the handheld device 2 is for performing photoepilation, and the energy source(s) 12 are to provide intense light pulses. For example the energy source(s) 12 can provide light pulses with spectral content in the 560-1200 nanometre (nm) range for a duration of around 2.5 milliseconds (ms), as these wavelengths heat melanin in the hair and hair root by absorption, which puts the hair follicles in a resting phase, preventing hair regrowth. In the case of an energy source 12 that generates sound, the energy source 12 can be configured to generate a sound pulse at any suitable or desired wavelength (or range of wavelengths) and/or intensities. For example, the energy source 12 can be an ultrasound transducer.

The one or more energy sources 12 are configured to provide pulses of energy. That is, the energy source(s) 12 are configured to generate energy at a high intensity for a short duration (e.g. less than 1 second). The intensity of the energy pulse should be high enough to effect the treatment operation on the skin or body part adjacent the aperture 10.

Of course, although the embodiment illustrated in FIG. 1 is a hand-held device 2 for performing an operation using energy or energy pulses, it will be appreciated that the head portion 6 can be configured to provide or perform other types of operations. For example, the hand-held device 2 can be a shaver or hair clippers, in which case the head portion 6 can comprise one or more cutting blades or foils for enabling hair to be cut when the head portion 6 is in contact with skin. As another example, the hand-held device 2 can be an ultrasound probe that is used to obtain ultrasound images. In this example, the head portion 6 can include an ultrasound transducer for generating ultrasound waves, and an ultrasound receiver for receiving the ultrasound waves reflected back from the inside of the body.

The illustrated hand-held device 2 also includes two skin contact sensors 14, 16 positioned on or in the head portion 6 that are used to determine when the head portion 6 is in contact with the skin. The skin contact sensors 14, 16 measure a parameter that is indicative of whether the head portion 6 is in contact with skin, and generate respective measurement signals (referred to as 'skin contact measurement signals') that comprise a time-series of measurements of the parameter. Typically a skin contact sensor is used in a hand-held device 2, particularly a photoepilator, to make sure that the hand-held device 2 is correctly in contact with skin before a light pulse is generated to avoid the light pulse being directed into the eyes of the user or subject. As noted herein, a measurement signal from a skin contact sensor can be used to identify a body part that the hand-held device 2 is in contact with.

In some embodiments the parameter can be capacitance, and so the skin contact sensors 14, 16 can measure capacitance via a respective pair of electrical contacts or electrodes on the surface of the head portion 6, with the measured capacitance being indicative of whether there is skin contact. In alternative embodiments, the parameter can be an intensity or level of light, and so the skin contact sensors 14, 16 can be light sensors that measure an intensity or level of light incident on the light sensor, with the measured intensity or level being indicative of whether there is skin contact (e.g. less/no light could indicate skin contact as the skin obscures the light sensors 14, 16, and vice versa). In other alternative embodiments, the parameter can be a measure of contact pressure, and so the skin contact sensors 14, 16 can measure contact pressure via respective pressure sensors or mechanical switches, with the measured contact pressure being indicative of whether there is skin contact.

The illustrated hand-held device 2 also includes a skin tone sensor 18 positioned on or in the head portion 6 that is used to determine a skin tone of the skin that the head portion 6 is in contact with. The skin tone sensor 18 measures a parameter that is indicative of the skin tone of the skin, and generates a measurement signal (referred to as a 'skin tone measurement signal') that comprises a time-series of measurements of the parameter. Typically a skin tone sensor is used in a hand-held device 2, particularly a photoepilator, to make sure that the light pulse has an intensity that is appropriate for the type of skin being treated, or even to prevent a light pulse being generated if the skin type is unsuitable for light pulses (e.g. darker skin which has a much higher melanin content). As noted herein, a measurement signal from a skin tone sensor can be used to identify a body part that the hand-held device 2 is in contact with.

In some embodiments the skin tone sensor 18 can be a light sensor and the parameter measured by the light sensor can be an intensity or level of light at a particular wavelength or multiple wavelengths reflected from the skin. The measured intensity or level of reflected light at a particular wavelength(s) can be indicative of the skin tone. The measured intensity or level of reflected light can be based on the concentration of melanin in the skin, and thus the measured intensity or level can indicate the melanin concentration. The melanin concentration can be derived, for example, from measurements of light reflection at 660 nm (red) and 880 nm (infrared) wavelengths.

The illustrated hand-held device 2 also includes a user control 20 that can be operated by the user to activate the hand-held device 2 so that the head portion 6 performs the required personal care operation on the body of the subject (e.g. the generation of an energy pulse by the one or more energy source(s) 12). Alternatively or in addition, the user control 18 can be used by the user to initiate the body-part identification techniques described herein. The user control 20 may be in the form of a switch, a button, a touch pad, etc.

Although not shown in FIG. 1, the head portion 6 can be formed as a removable attachment that is intended for use on particular body parts. The removable attachments are also referred to herein as removable head portions. A number of removable attachments can be provided that each have a respective shape and respective aperture size, and the attachment can be selected for use on the hand-held device 2 based on the body part to be treated. For example different attachments can be provided for use on the face, for use in the armpits, for use at the bikini line, and for use generally on the body (e.g. the larger body surface areas).

Figure 2:
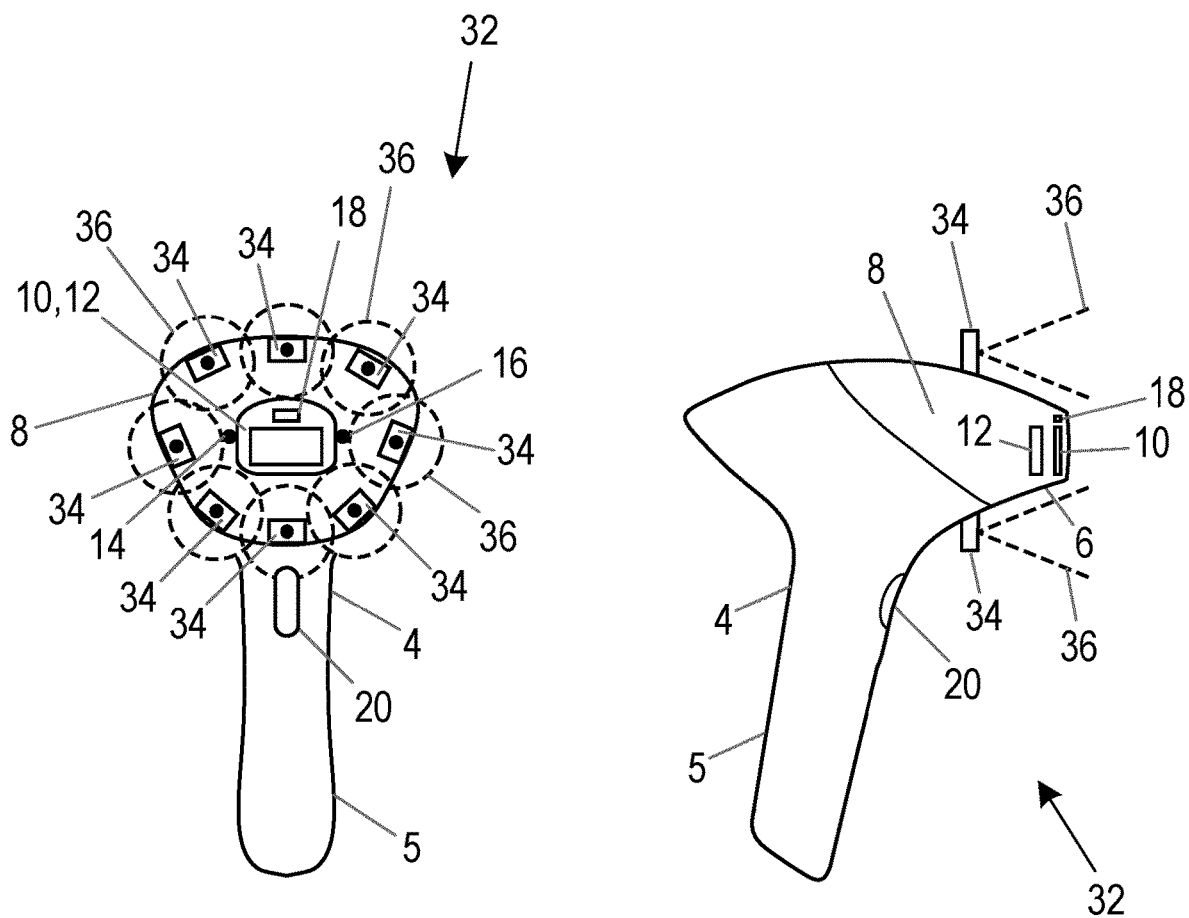
FIG. 2 is an illustration of an alternative exemplary hand-held device comprising skin contact sensors, a skin tone sensor and proximity sensors.
Figure 2:
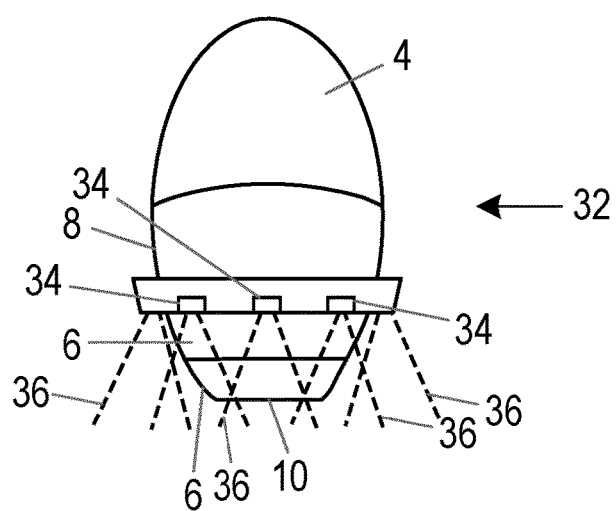

FIG. 2 shows several views of an alternative exemplary hand-held device 32 that includes skin contact sensors, a skin tone sensor and proximity sensors. FIG. 2 shows a front view of the hand-held device 32 (i.e. facing the head portion 6), a side cross-section through the hand-held device 32 and a top view of the hand-held device 32. FIG. 2 also shows the field of view (FOV) for the proximity sensors.

The hand-held device 32 shown in FIG. 2 generally corresponds to the hand-held device 2 shown in FIG. 1, and the same reference numbers are used for the same features and elements of the hand-held device 32 as the hand-held device 2.

In addition to the skin contact sensors 14, 16 and the skin tone sensor 18, the hand-held device 32 in FIG. 2 comprises eight proximity sensors 34 arranged in or on the hand-held device 32 that are used to measure proximity or distance to the skin close to the part of the skin in contact with the head portion 6. In practical implementations, it will be appreciated that more or less than eight proximity sensors 34 can be used in a hand-held device 32. Indeed, in some embodiments a single proximity sensor 34 can be used. However, as described in more detail below, the proximity sensor(s) 34 are used to observe or measure the shape (profile) of the body part around the area of skin that the head portion 6 is in contact with, and therefore it is preferable for the hand-held device 32 to include a plurality (i.e. at least two) proximity sensors 34. The more proximity sensors 34 that are used, the higher the resolution of the observed or measured shape (profile) of the skin. In the embodiment shown in FIG. 2 the eight proximity sensors 34 are located at the head end 8 and are arranged generally evenly around the head portion 6. In the illustrated embodiment, each proximity sensor 34 is positioned in or on the head end 8 such that the proximity sensor 34 is 'set back' from the head portion 6 (i.e. each proximity sensor 34 is offset from the plane of the head portion 6), as this improves the field of view of the proximity sensor 34, and may mean that a non-zero distance is measured when the head portion 6 is in contact with skin. In alternative embodiments, each proximity sensor can be positioned in the same plane as (i.e. planar with) the head portion 6.

Each proximity sensor 34 measures a parameter that is indicative of proximity of skin to the proximity sensor 34, and in particular measures a parameter that is indicative of a distance from the proximity sensor 34 to skin adjacent to the skin that the head portion 6 is in contact with. Each proximity sensor 34 generates a respective measurement signal (referred to a 'proximity measurement signal') that comprises a time-series of measurements of the parameter.

In some embodiments, each proximity sensor 34 can measure distance based on a time-of-flight of energy from an energy source in the proximity sensor 34 to an energy sensor in the proximity sensor 34 after reflection from an opposing surface (i.e. skin). For example the proximity sensor 34 can include a light source (e.g. an infrared (IR) light source that emits IR light at around 850 nm or a visible light source) and a light sensor that is sensitive to at least the wavelength(s) of light emitted by the light source, and the proximity/distance can be determined based on an analysis of the time-of-flight of the light. As another example, the proximity sensor 34 can include a sound source, such as a loudspeaker, for emitting sound at one or more frequencies, (e.g. the emitted sound can be ultrasound) and a sound sensor (e.g. microphone) that is sensitive to at least the frequency/ies of sound emitted by the sound source. The proximity/distance can be determined based on an analysis of the time-of-flight of the sound.

A field of view (FOV) 36 is shown for each of the proximity sensors 34 in FIG. 2, and the FOV 36 represents the area in which the relevant proximity sensor 34 can measure a distance. For example, the FOV 36 can represent the directions in which light/sound can be emitted from a source and/or the direction in which the sensor is sensitive to incident light/sound. It can be seen that the 8 proximity sensors 34 are arranged around the circumference of the head portion 6 so that the FOVs 36 overlap, providing full coverage around the circumference.

Figure 3:
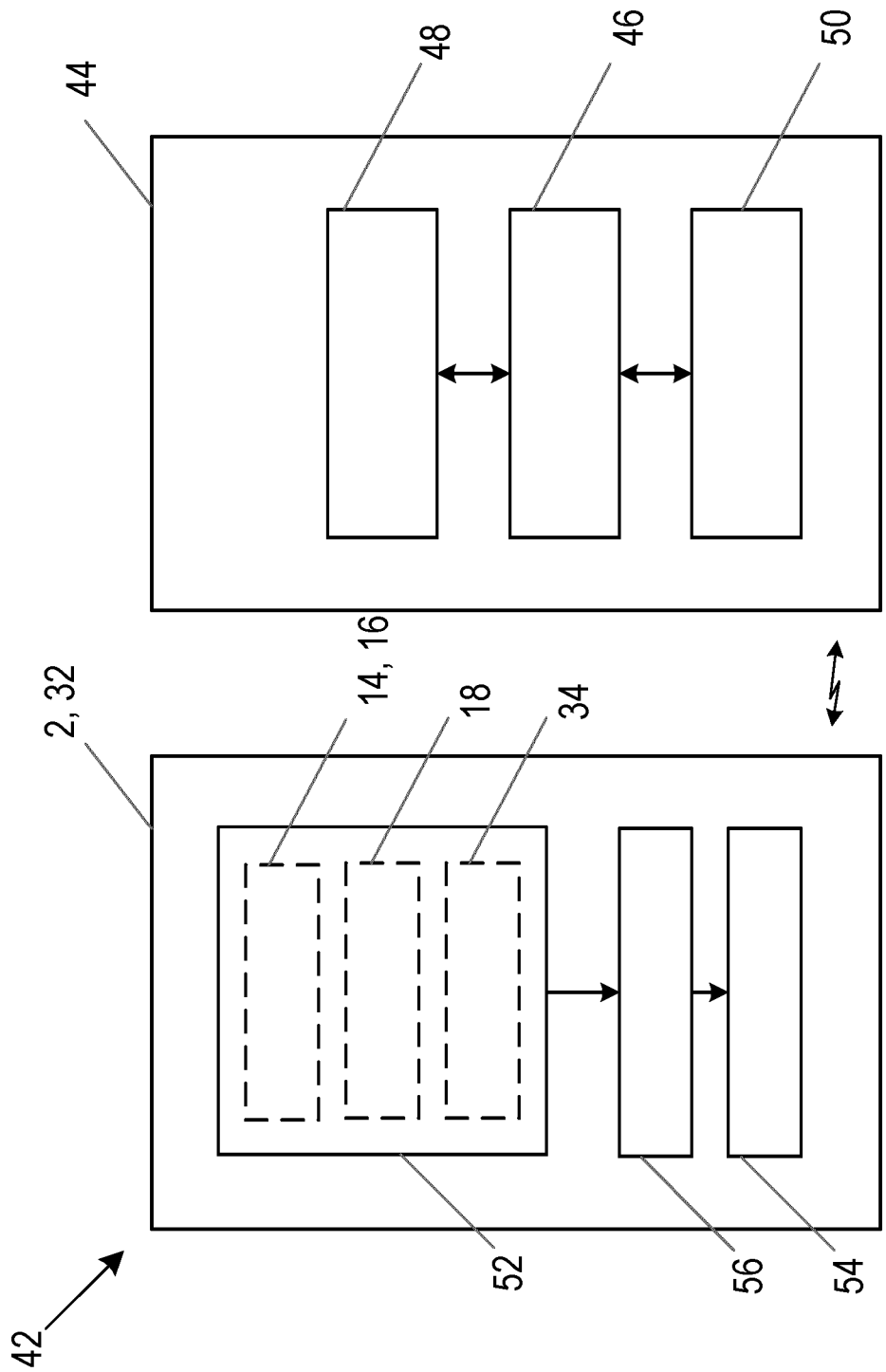
FIG. 3 is a block diagram of an exemplary system comprising a hand-held device for performing a personal care operation and an apparatus for identifying a body part on which the hand-held device is used.

FIG. 3 is a block diagram of an exemplary system 42 comprising a hand-held device 2, 32 for performing a personal care operation and an apparatus 44 for identifying a body part on which the hand-held device 2, 32 is used. The apparatus 44 is shown as part of system 42 that also includes the hand-held device 2, 32 (e.g. a photoepilation device, a shaving device, hair clippers, etc.). In the embodiments shown in FIG. 3, the apparatus 44 is a separate apparatus to the hand-held device 2, 32, and thus the apparatus 44 may be in the form of an electronic device, such as a smart phone, smart watch, tablet, personal digital assistant (PDA), laptop, desktop computer, smart mirror, etc. In other embodiments, the apparatus 44, and particularly the functionality according to the invention provided by the apparatus 44, is part of the hand-held device 2, 32. In yet other embodiments, the functionality according to the various embodiments of the invention described below can be split between the hand-held device 2, 32 and a separate apparatus 44.

The apparatus 44 comprises a processing unit 46 that generally controls the operation of the apparatus 44 and enables the apparatus 44 to perform the method and techniques described herein. Briefly, the processing unit 44 receives measurement signals from one or more of a skin contact sensor 14, 16, skin tone sensor 18 and one or more proximity sensors 34 during a personal care operation, and analyses the measurement signal(s) using a trained machine learning model (MLM) to identify the body part that the hand-held device 2, 32 is being used on.

Thus the processing unit 46 can be configured to receive the measurement signal(s) from another component of the apparatus 44 and therefore the processing unit 46 can include or comprise one or more input ports or other components for receiving the measurement signal(s) from the other component. The processing unit 46 can also include or comprise one or more output ports or other components for communicating with other components of the apparatus 44.

The processing unit 46 can be implemented in numerous ways, with software and/or hardware, to perform the various functions described herein. The processing unit 46 may comprise one or more microprocessors or digital signal processors (DSPs) that may be programmed using software or computer program code to perform the required functions and/or to control components of the processing unit 46 to effect the required functions. The processing unit 46 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The processing unit 46 can comprise or be associated with a memory unit 48. The memory unit 48 can store data, information and/or signals (including measurement signal(s) and/or information or computer code defining the trained MLM) for use by the processing unit 46 in controlling the operation of the apparatus 44 and/or in executing or performing the methods described herein. In some implementations the memory unit 48 stores computer-readable code that can be executed by the processing unit 46 so that the processing unit 46 performs one or more functions, including the methods described herein. In particular embodiments, the program code can be in the form of an application for a smart phone, tablet, laptop or computer. The memory unit 48 can comprise any type of non-transitory machine-readable medium, such as cache or system memory including volatile and non-volatile computer memory such as random access memory (RAM), static RAM (SRAM), dynamic RAM (DRAM), read-only memory (ROM), programmable ROM (PROM), erasable PROM (EPROM) and electrically erasable PROM (EEPROM), and the memory unit can be implemented in the form of a memory chip, an optical disk (such as a compact disc (CD), a digital versatile disc (DVD) or a Blu-Ray disc), a hard disk, a tape storage solution, or a solid state device, including a memory stick, a solid state drive (SSD), a memory card, etc.

In the embodiment shown in FIG. 3, as the apparatus 44 is separate from the hand-held device 2, 32, the apparatus 44 also includes interface circuitry 50 to enable the apparatus 44 to receive the measurement signal(s) from the hand-held device 2, 32. The interface circuitry 50 in the apparatus 44 enables a data connection to and/or data exchange with other devices, including any one or more of hand-held device 2, 32, servers, databases, user devices, and sensors. The connection to the hand-held device 2, 32 (or any other device) may be direct or indirect (e.g. via the Internet), and thus the interface circuitry 50 can enable a connection between the apparatus 44 and a network, or directly between the apparatus 44 and another device (such as hand-held device 2, 32), via any desirable wired or wireless communication protocol. For example, the interface circuitry 50 can operate using WiFi, Bluetooth, Zigbee, or any cellular communication protocol (including but not limited to Global System for Mobile Communications (GSM), Universal Mobile Telecommunications System (UMTS), Long Term Evolution (LTE), LTE-Advanced, etc.). In the case of a wireless connection, the interface circuitry 50 (and thus apparatus 44) may include one or more suitable antennas for transmitting/receiving over a transmission medium (e.g. the air). Alternatively, in the case of a wireless connection, the interface circuitry 50 may include means (e.g. a connector or plug) to enable the interface circuitry 50 to be connected to one or more suitable antennas external to the apparatus 44 for transmitting/receiving over a transmission medium (e.g. the air). The interface circuitry 50 is connected to the processing unit 46.

Although not shown in FIG. 3, the apparatus 44 may comprise one or more user interface components that includes one or more components that enables a user of apparatus 44 to input information, data and/or commands into the apparatus 44, and/or enables the apparatus 44 to output information or data to the user of the apparatus 44. The user interface can comprise any suitable input component(s), including but not limited to a keyboard, keypad, one or more buttons, switches or dials, a mouse, a track pad, a touchscreen, a stylus, a camera, a microphone, etc., and the user interface can comprise any suitable output component(s), including but not limited to a display unit or display screen, one or more lights or light elements, one or more loudspeakers, a vibrating element, etc.

It will be appreciated that a practical implementation of an apparatus 44 may include additional components to those shown in FIG. 3. For example the apparatus 44 may also include a power supply, such as a battery, or components for enabling the apparatus 44 to be connected to a mains power supply.

The hand-held device 2, 32 shown in FIG. 3 includes one or more sensors 52 for measuring a respective parameter and generating respective measurement signals as the hand-held device 2, 32 is used on the skin of the subject.

In some embodiments, the one or more sensors 52 comprises a skin contact sensor 14, 16 or a plurality of skin contact sensors 14, 16. In some embodiments, the one or more sensors 52 comprises a skin tone sensor 18 or a plurality of skin tone sensors 18. In some embodiments, the one or more sensors 52 comprises a proximity sensor 34 or a plurality of proximity sensors 34. In other embodiments, the one or more sensors 52 comprises any combination of: one or more skin contact sensors 14, 16, one or more skin tone sensors 18, and/or one or more proximity sensors 34.

The hand-held device 2, 32 further comprises interface circuitry 54 for transmitting signals from the hand-held device 2, 32 to the apparatus 44, including the measurement signal(s). The interface circuitry 54 can be implemented according to any of the options outlined above for the interface circuitry 50 in the apparatus 44 in order to communicate with the interface circuitry 50 in the apparatus 44.

The hand-held device 2, 32 may further comprise a device processing unit 56 that generally controls the operation of the hand-held device 2, 32, for example activating and deactivating a personal care portion to effect a personal care operation. The device processing unit 56 can be implemented in numerous ways according to any of the options outlined above for the processing unit 46 in the apparatus 44.

The device processing unit 56 can be connected to the one or more sensors 52 and receives the measurement signal(s) from the one or more sensors 52, for example via an input port to the device processing unit 56. In some embodiments, the device processing unit 56 may output the measurement signal(s) to the interface circuitry 54 for transmission to the apparatus 44 for subsequent processing.

In some implementations of FIG. 3, the apparatus 44 is a smart phone, tablet or smart mirror that is executing an application that provides the functionality according to the invention.

In embodiments where the apparatus 44, or the functionality of the apparatus 44, is part of the hand-held device 2, 32, the device processing unit 56 can implement the functions of the apparatus processing unit 46 to identify the body part that the hand-held device 2, 32 is used on.

It will be appreciated that a practical implementation of hand-held device 2, 32 may include additional components to those shown in FIG. 3. For example the hand-held device 2, 32 may also include a power supply, such as a battery, or components for enabling the hand-held device 2, 32 to be connected to a mains power supply.

During use of a hand-held device 2, 32 that has one or more sensors 52, the measurement signal(s) generated by sensor(s) will exhibit unique (or at least distinguishable) patterns according to the body part that the hand-held device 2, 32 is being used on at the time. Therefore, it has been recognised that machine learning techniques can be used to identify these patterns when they arise during a personal care operation, and match them to the corresponding body part, for example a foot, a leg, a lower leg, an upper leg, abdomen, torso, chest, back, a hand, an arm, a lower arm, an upper arm, an armpit, a shoulder, neck, face, upper lip, scalp, or head. The patterns may also enable a left or right body part (e.g. left or right leg) to be distinguished from each other.

At a high conceptual level, the body part identification based on the above mentioned sensors 52 can be understood by considering a number of effects that different body parts may have on the measurement signals from some of these sensors 52.

Firstly, the extent to which skin contact can be made between the hand-held device 2, 32 and the subject's skin can depend on the body part. For example, at the upper lip, skin contact is typically less than at other body parts due to higher body curvature. In the case of a capacitance-based skin contact sensor 14, 16, this lower skin contact will have an effect on the signal strength of the capacitance signal. In addition, the capacitance signal depends on the electrical (dielectric) properties of the skin, which may vary between different body parts. In particular the skin is composed of layers of heterogeneous tissues perforated by oil and sweat ducts. The concentration of these ducts and ion-permeability of the tissues varies over various body parts, for example sweat-glands are more populous in the armpit region, and so the capacitance signal response varies between body parts.

Secondly, skin tone and skin optical properties in general can vary between different body parts, which can affect the measurement signal from an optical-based skin tone sensor 18. In addition, the degree of skin contact can affect the signal strength of the skin tone measurement signal.

Thirdly, an optical-based proximity sensor 34 measures the amount of light that is reflected back by the subject's skin. The amount of received light depends on factors like the distance between the proximity sensor 34 and the skin, the 'fill factor', i.e. how much of the FOV 36 is 'filled' with body/skin), the angle between the skin and the FOV 36 of the proximity sensor 34, and the optical properties of the skin. Hence, for any given configuration of the proximity sensor(s) 34, i.e. in terms of the placement and orientation of the proximity sensor(s) 34 with respect to the head portion 6 and each other, it can be understood that the location and orientation of the IPL device on the body influences the combination of signals from the sensors.

As there are a number of effects that different body parts can have on the measurement signals from these sensors 52, a MLM is trained to identify body parts from the measurement signals. This data-driven approach means that measurement signals for the one or more sensors 52 are acquired for a population of subjects during a personal care operation on a number of different body parts, where the respective body parts are known (i.e. annotated) throughout the personal care operation. Subsequently, a supervised MLM can be applied to this acquired training data. This results in a deployable trained classifier algorithm that outputs the identified body part based on input measurement signal(s). The machine learning model may be, for example, any of a logistic regression model, a support vector machine, a random forest, a Naïve Bayes classifier, a nearest neighbour classifier, a decision tree classifier, an artificial neural network, or any combination thereof.

In some implementations of the body part identification algorithm, the body part may be identified continuously for every new measurement sample from the one or more sensors 52. However, the classification accuracy may be improved by aggregating measurement samples over time and identifying the body part treated during a certain time interval. This may be helpful since a user will typically finish treating one body part before moving to the next body part. The time intervals over which measurement samples can be aggregated could be of fixed length, e.g. a few seconds. As an alternative, the time interval over which measurement samples are aggregated could be variable to match the length of time that the hand-held device 2, 32 is in contact with the subject's skin (when the one or more sensors 52 includes a skin contact sensor 14, 16), and this is based on the assumption that the user will likely lift the hand-held device 2, 32 off of the skin during a transition between different body parts.

If the measurement samples are aggregated over time, additional features can be determined by the MLM either explicitly by means of processing of the measurement signals, or implicitly if, for example, the MLM is a deep neural network. Examples of such features could be the average value of the parameter measured by the sensor 52 or the standard deviation of the measured parameter per sensor 52, but many other features, including features relating to the statistical properties of the parameter could be determined.

Results demonstrating the effectiveness of the above techniques in identifying body parts are now presented with respect to a hand-held device 2, 32 in the form of a photoepilator. Training data for the MLM was compiled from 15 female participants who used a photoepilator having two skin contact sensors 14, 16, a skin tone sensor 18 and 8 proximity sensors 34. Each participant carried out at least two personal care sessions in which the following body parts were consecutively treated: the arm, the leg, the lower abdomen, (a so-called 'belly-bikini' part), the bikini-line, the face and the armpit. The measurement samples were acquired throughout the personal care operations at a sampling frequency of 10 Hz, and the measurement signals were annotated with the relevant body part.

With the acquired measurement signals a MLM in the form of a random forest classifier was trained for the body part detection. The classifier is sample based, i.e. at each measurement sample an instantaneous estimate of the body part is made.

Tables 1-3 below are confusion matrices representing the classifier performance for three different versions of the random forest classifier. The confusion matrices indicate for each actual (correct) body part the predictions made by the classifier, i.e. the fraction of samples the classifier outputted as arm, leg, etc. To obtain the results shown in the confusion matrices, a leave-one-subject-out cross validation was used. This means that for each subject the performance of the classifier is assessed, with the classifier being trained using the data for all of the other subjects. The confusion matrices show the average results over all subjects, and the diagonals provide the classification accuracy for the different body parts.

Table 1 is a confusion matrix for a random forest classifier based on the measurement signals from the skin contact sensors 14, 16 and the skin tone sensor 18.

TABLE 1

| | Prediction | | | | | |
|---|---|---|---|---|---|---|
| Actual | Arm | Leg | Belly-bikini | Bikini-line | Face | Armpit |
| Arm | 0.47 | 0.34 | 0.11 | 0.01 | 0.04 | 0.03 |
| Leg | 0.36 | 0.41 | 0.18 | 0.01 | 0.02 | 0.02 |
| Belly-bikini | 0.18 | 0.29 | 0.48 | 0.02 | 0.02 | 0.01 |
| Bikini-line | 0.02 | 0.04 | 0.04 | 0.84 | 0.01 | 0.05 |
| Face | 0.09 | 0.09 | 0.02 | 0.02 | 0.75 | 0.03 |
| Armpit | 0.04 | 0.07 | 0.02 | 0.13 | 0.02 | 0.72 |

Average accuracy: 0.61

Table 2 is a confusion matrix for a random forest classifier based only on the measurement signals from the proximity sensors 34.

TABLE 2

| Actual | Prediction | | | | | |
|---|---|---|---|---|---|---|
| | Arm | Leg | Belly-bikini | Bikini-line | Face | Armpit |
| Arm | 0.65 | 0.30 | 0.02 | 0.00 | 0.01 | 0.02 |
| Leg | 0.12 | 0.74 | 0.02 | 0.04 | 0.01 | 0.07 |
| Belly-bikini | 0.00 | 0.02 | 0.70 | 0.18 | 0.01 | 0.09 |
| Bikini-line | 0.00 | 0.04 | 0.33 | 0.51 | 0.01 | 0.11 |
| Face | 0.02 | 0.04 | 0.01 | 0.01 | 0.93 | 0.00 |
| Armpit | 0.01 | 0.08 | 0.11 | 0.11 | 0.00 | 0.68 |

Average accuracy: 0.70

Table 3 is a confusion matrix for a random forest classifier based on the measurement signals from the skin contact sensors 14, 16, the skin tone sensor 18 and the proximity sensors 34.

TABLE 3

| Actual | Prediction | | | | | |
|---|---|---|---|---|---|---|
| | Arm | Leg | Belly-bikini | Bikini-line | Face | Armpit |
| Arm | 0.71 | 0.27 | 0.01 | 0.00 | 0.01 | 0.00 |
| Leg | 0.15 | 0.78 | 0.06 | 0.00 | 0.01 | 0.01 |
| Belly-bikini | 0.00 | 0.05 | 0.88 | 0.04 | 0.01 | 0.02 |
| Bikini-line | 0.00 | 0.01 | 0.08 | 0.81 | 0.01 | 0.10 |
| Face | 0.02 | 0.04 | 0.00 | 0.01 | 0.92 | 0.01 |
| Armpit | 0.00 | 0.02 | 0.04 | 0.11 | 0.00 | 0.83 |

Average accuracy: 0.82

As indicated, on average, the percentages of correct prediction by the random forest classifier are 61%, 70%, and 82% respectively for the three versions of the classifier. As can be expected, the performance of the classifier increases with the number of sensors evaluated as part of the classifier.

Figure 4:
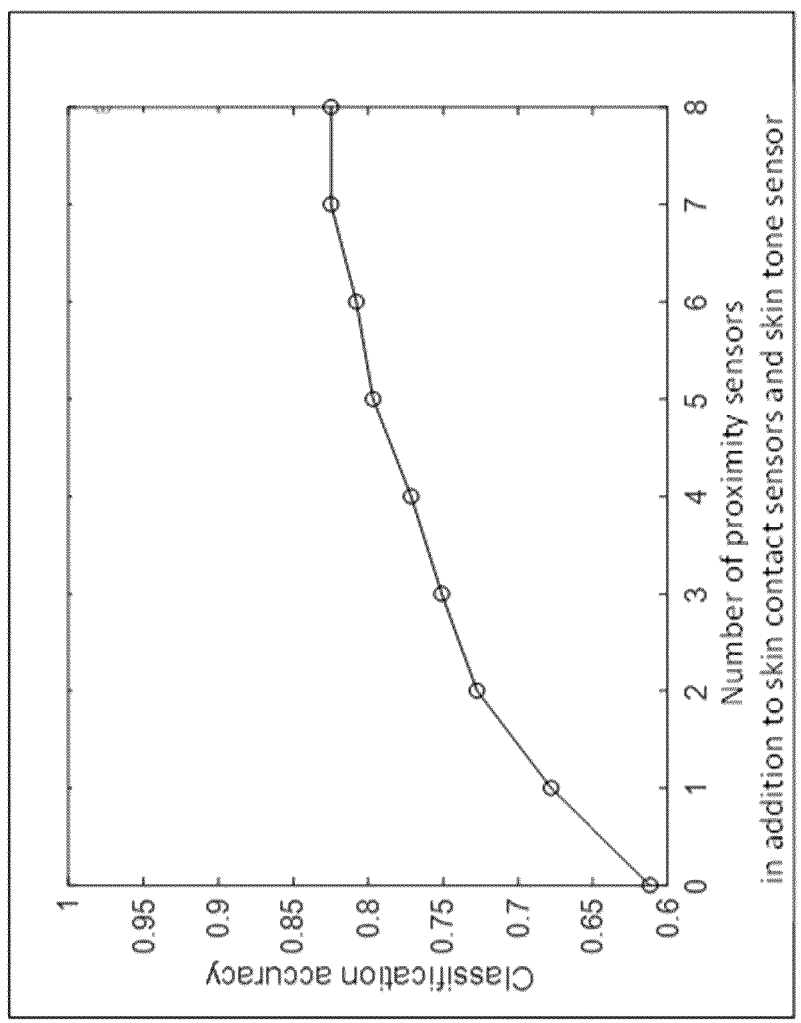
FIG. 4 is a plot of the classification accuracy against the number of proximity sensors used.

The increase in classification accuracy (i.e. percentage of correct prediction) with the number of proximity sensors 8 used in addition to the skin contact sensors 14, 16 and skin tone sensor 18 is depicted in FIG. 4. FIG. 4 shows a plot of the classification accuracy against the number of proximity sensors 34 used. The plot was generated via backwards elimination, i.e. starting with the measurement signals for all 8 proximity sensors 34, classifier training is iteratively performed with omission of the least significant proximity measurement signal on each next iteration. Thus it can be seen that the classification accuracy improves with the number of proximity sensors 34, but the improvement-per-additional-proximity sensor reduces the more proximity sensors 34 are used.

Figure 5A:
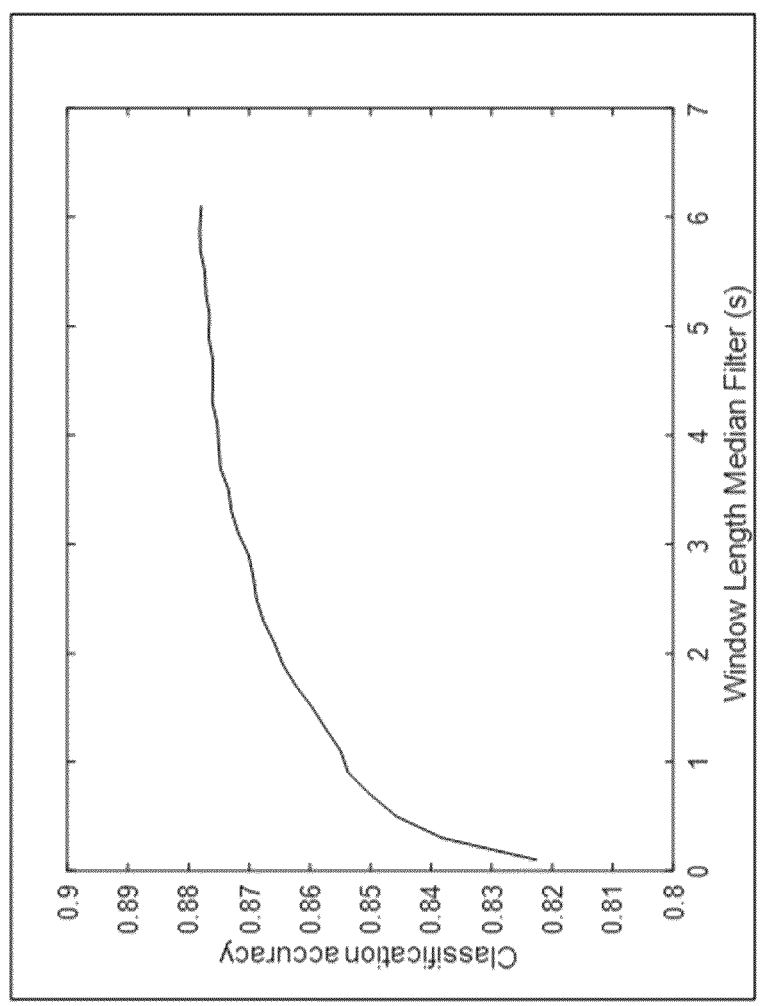
FIG. 5(a) is a plot of the classification accuracy as a function of the length of a median filter and FIG. 5(b) is a plot of the classification accuracy as a function of the length of a mode filter.

As discussed above, the per-measurement sample identification of a body part may be aggregated over time in order to obtain more accurate results. An example is the application of a median filter over the output of the classifier. In general median filtering is known in the field of signal processing and in this particular case the median filter suppresses occasional misclassifications of body parts in a selected time window. The plot in FIG. 5(a) shows the classification accuracy as a function of the length of the median filter (as measured in seconds, s) for the scenario where each of the skin contact sensors 14, 16, skin tone sensor 18 and 8 proximity sensors 34 are used. It can be seen that the accuracy increases from 82% when no median filter is used to 88% when a median filter length of 6 seconds is used (with a 6-second long filter meaning that the classifier output is aggregated over a 6-second time interval).

Figure 5B:
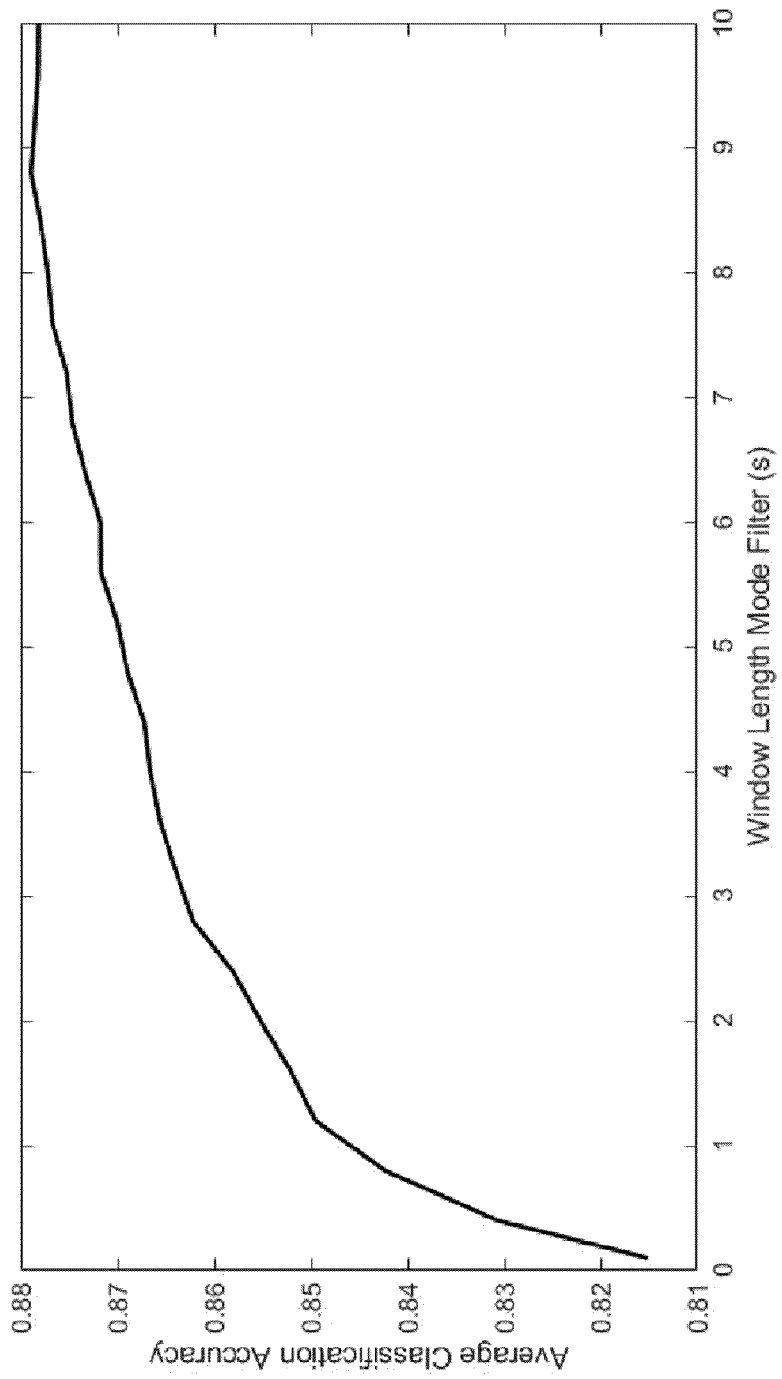

In a more preferred example, the per-measurement sample identification of a body part may be aggregated over time by applying a mode filter over the output of the classifier. A mode filter can be preferred over a median filter as it is being used to output a value of a categorical variable, i.e. a body part. In general mode filtering is known in the field of signal processing and in this particular case the mode filter suppresses occasional misclassifications of body parts in a selected time window by outputting the body part that has been identified the most times in the time window. The plot in FIG. 5(b) shows the classification accuracy as a function of the length of the mode filter (as measured in seconds, s) for the scenario where each of the skin contact sensors 14, 16, skin tone sensor 18 and 8 proximity sensors 34 are used. It can be seen that the accuracy increases from 81.5% when no mode filter is used to 88% when a mode filter length of 9 seconds is used (with a 9-second long filter meaning that the classifier output is aggregated over a 9-second time interval).

In the above example the training data for the MLM was acquired in a controlled subject test. Alternatively, training data may be acquired from 'consumers in the field' by obtaining the measurement signal(s) from sensor(s) 52 in the hand-held devices 2, 32 during personal care operations, and receiving annotations of the relevant body parts. The measurement signal(s) can be made available to a connected device (e.g. apparatus 44), such as a smartphone, and the user/subject can use an application on the smartphone to annotate the signal(s) with the relevant body part.

In some cases, even once the classifier (or more generally a trained MLM) has been trained and is in use, further measurement signal(s) obtained during use of the hand-held device 2, 32 can be used to update (re-train) the classifier to improve the classification accuracy (i.e. due to the increased size of the training set).

Similarly (or in addition), training or re-training the MLM based on measurement signal(s) for a particular subject enables the MLM to be personalised to the subject (e.g. personalised to the body shape of the subject), thereby increasing the accuracy for that subject. Thus, the MLM can be trained based on measurement signal(s) obtained during one or more 'calibration' personal care operations carried out on that subject. These calibration operations can involve guiding the user to apply the hand-held device 2, 32 to specific body parts of the subject, or alternatively the user or subject could indicate via a user interface the body part that is/was treated.

In the context of the above results shown in Tables 1-3, support for the increased accuracy provided by personalisation of the MLM to a particular subject can be seen when training the random forest classifier and assessing performance by means of leave-one-session-out cross validation for each subject individually. On average the classifier accuracies obtained are 78% when using only skin contact sensors 14, 16 and a skin tone sensor 18, 78% when using only the proximity sensors 34, and 89% when using the skin contact sensors 14, 16, the skin tone sensor 18 and the 8 proximity sensors 34. When comparing these reliabilities with those reported above for the classifier when trained for the whole population of test subjects (61%, 70% and 82% respectively), the increase in accuracy is clear. In addition, as well as providing a higher accuracy when the accuracy is averaged over different subjects, the variation in classifier accuracy between subjects is less when the classifier is personalised to the subject.

A more detailed explanation of the structure, training and performance of a MLM based on measurement signals from two skin contact sensors 14, 16 and a skin tone sensor 18 according to the techniques presented herein is set out below with reference to FIGS. 6-17.

Training data for the MLM was compiled from 15 female participants who used a photoepilator having two skin contact sensors 14, 16 and a skin tone sensor 18. Each participant carried out multiple personal care sessions in which the following body parts were consecutively treated: the lower arm, the lower leg, the lower abdomen, (a so-called 'belly-bikini' part), the bikini-line, the face (upper lip) and the armpit. When treating these body parts, the appropriate removable attachment was used on the photoepilator. Thus, a general body attachment is used for the lower leg, lower arm and belly-bikini, a bikini-line attachment is used for the bikini line, a face attachment is used for the face and an armpit attachment is used for the armpit.

To collect the measurement signals, the participant moved the device over their body and ensured proper skin contact at each movement step. In the photoepilator used for acquiring the measurement signals, proper contact is indicated by a light indicator being illuminated on the photoepilator, and the operation of the light indicator is dependent on the measurement signals from the skin contact sensors 14, 16 exceeding a contact threshold. In other test scenarios, proper contact may not be indicated to the user, and/or may not be required for the collection of suitable measurement signals. In addition, the photoepilator used for acquiring the measurement signals was configured such that the measurement signal from the skin tone sensor 18 was only acquired when the skin contact sensors 14, 16 indicated proper skin contact (i.e. when the skin contact measurement signals exceeded the threshold). The amount of time that the hand-held device 2, 32 was used on each body part was variable and determined by the participant, although instructions were provided that each body part should be covered as much as possible, and a desired minimum treatment time of about 40 seconds to 1 minute (dependent on body area) was also indicated. The body part that the hand-held device 2, 32 was used on was indicated by the participant, so the acquired measurement signals are annotated with the name of the relevant body part.

Figure 6:
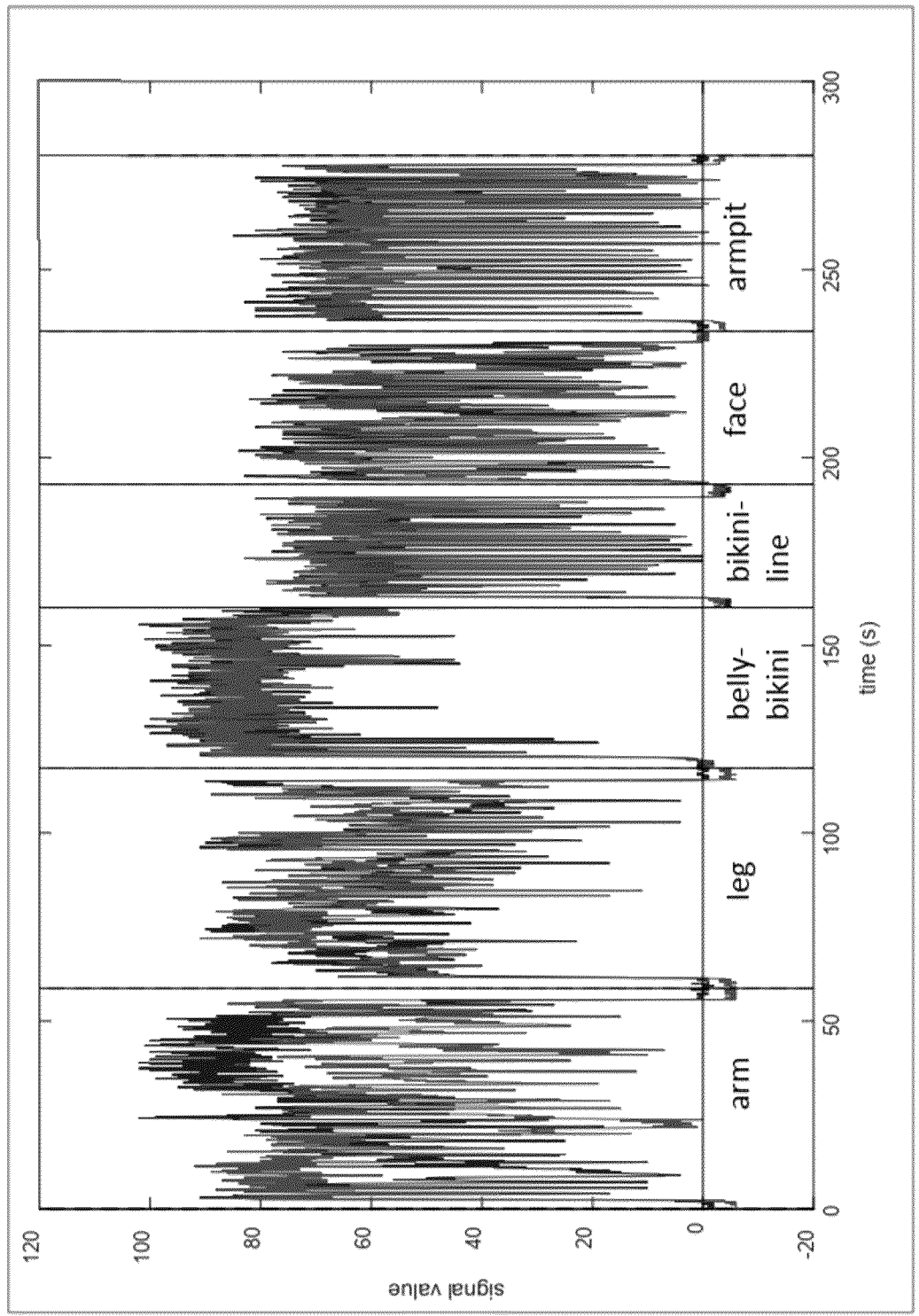
FIG. 6 is a plot showing exemplary measurement signals from skin contact sensors obtained in a training data collection phase.

The plot in FIG. 6 shows exemplary measurement signals from skin contact sensors 14, 16 obtained in the above training data collection phase for the body parts: arm, leg, belly-bikini, bikini-line, face and armpit. For ease of illustration, parts of the measurement signals not relating to a labelled body part (e.g. parts of the measurement signals corresponding to where the hand-held device 2, 32 was lifted off of the body and repositioned on a different body part) have been omitted in FIG. 6.

Table 4 below provides an overview of the number of usable measurement samples obtained per subject (participant), per session and per body part. The usable measurement samples are derived from the skin contact measurement signal from the skin contact sensor 14 (referred to as SDS1) after correction for bias, from the skin contact measurement signal from the skin contact sensor 16 (referred to as SDS2) after correction for bias, and from the skin tone measurement signal from the skin tone sensor 18 (referred to as STSS) which correlates with skin tone and which is derived from the measured reflection intensity relating to red (660 nm) light, referred to as STSRed, which is corrected for background light, and the measured reflection intensity relating to infrared (880 nm) light, referred to as STSIR, which is corrected for background light. In a practical implementation where the personal care operation involves the generation of light pulses which causes the temperature of the hand-held device 2, 32 to increase, or in implementations where the temperature of the hand-held device 2, 32 otherwise changes during the personal care operation, it is also useful to correct STSRed and STSIR for the temperature of the hand-held device 2, 32. It will be noted in Table 4 that for two sessions no samples were obtained, this is due to a data acquisition failure in that session.

TABLE 4

| Subject | Session | Arm | Leg | Belly-bikini | Bikini-line | Face | Armpit | Total |
|---|---|---|---|---|---|---|---|---|
| 1 | 1 | 337 | 432 | 390 | 194 | 145 | 268 | 1766 |
|   | 2 | 293 | 416 | 366 | 332 | 346 | 202 | 1955 |
| 2 | 1 | 316 | 342 | 297 | 278 | 245 | 207 | 1685 |
|   | 2 | 308 | 424 | 280 | 324 | 230 | 232 | 1798 |
|   | 3 | 300 | 408 | 287 | 291 | 302 | 255 | 1843 |
|   | 4 | 320 | 395 | 242 | 263 | 265 | 257 | 1742 |
| 3 | 1 | 318 | 381 | 241 | 0 | 299 | 522 | 1761 |
|   | 2 | 431 | 357 | 481 | 330 | 294 | 391 | 2284 |
|   | 3 | 368 | 401 | 454 | 0 | 303 | 408 | 1934 |
| 4 | 1 | 485 | 1059 | 459 | 331 | 364 | 260 | 2958 |
|   | 2 | 575 | 876 | 446 | 370 | 390 | 278 | 2935 |
| 5 | 1 | 528 | 680 | 339 | 347 | 278 | 344 | 2516 |
|   | 2 | 0 | 0 | 0 | 0 | 0 | 0 | 0 |
| 6 | 1 | 785 | 953 | 400 | 403 | 404 | 473 | 3418 |
|   | 2 | 458 | 589 | 443 | 303 | 0 | 0 | 1793 |
| 7 | 1 | 632 | 528 | 438 | 326 | 351 | 422 | 2697 |
|   | 2 | 554 | 485 | 388 | 419 | 365 | 361 | 2572 |
| 8 | 1 | 591 | 2270 | 375 | 373 | 409 | 132 | 4150 |
|   | 2 | 674 | 1118 | 397 | 260 | 234 | 176 | 2859 |
| 9 | 1 | 253 | 275 | 126 | 69 | 121 | 81 | 925 |
|   | 2 | 0 | 0 | 0 | 0 | 0 | 0 | 0 |
| 10 | 1 | 367 | 436 | 281 | 273 | 217 | 272 | 1846 |
|   | 2 | 328 | 391 | 317 | 281 | 266 | 287 | 1870 |
| 11 | 1 | 506 | 588 | 353 | 250 | 325 | 270 | 2292 |
|   | 2 | 595 | 688 | 399 | 336 | 359 | 387 | 2764 |
| 12 | 1 | 303 | 397 | 195 | 225 | 109 | 249 | 1478 |
|   | 2 | 297 | 348 | 250 | 166 | 92 | 246 | 1399 |

TABLE 4-continued

| | | Number of samples | | | | | | |
|---|---|---|---|---|---|---|---|---|
| Subject | Session | Arm | Leg | Belly-bikini | Bikini-line | Face | Armpit | Total |
| 13 | 1 | 351 | 464 | 191 | 258 | 86 | 244 | 1594 |
|  | 2 | 256 | 354 | 277 | 205 | 117 | 261 | 1470 |
| 14 | 1 | 494 | 426 | 322 | 275 | 247 | 238 | 2002 |
|  | 2 | 292 | 373 | 431 | 218 | 264 | 315 | 1893 |
| 15 | 1 | 881 | 1240 | 610 | 265 | 213 | 632 | 3841 |
|  | 2 | 884 | 1469 | 693 | 286 | 207 | 442 | 3981 |
| Total | | 14080 | 19563 | 11168 | 8251 | 7847 | 9112 | 70021 |

Figure 7A:
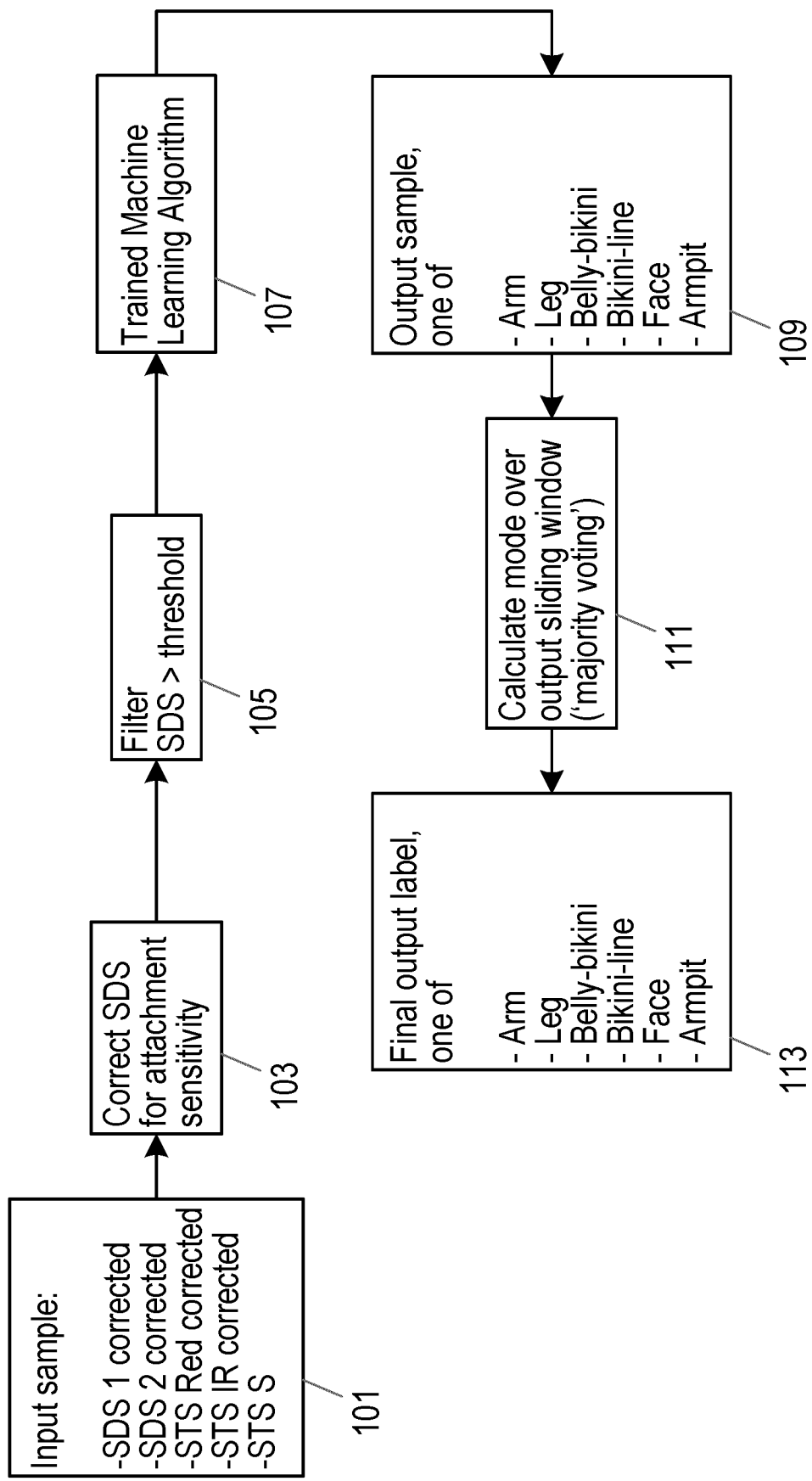
FIG. 7 shows two flow charts illustrating exemplary techniques for analysing measurement signals.
Figure 7B:
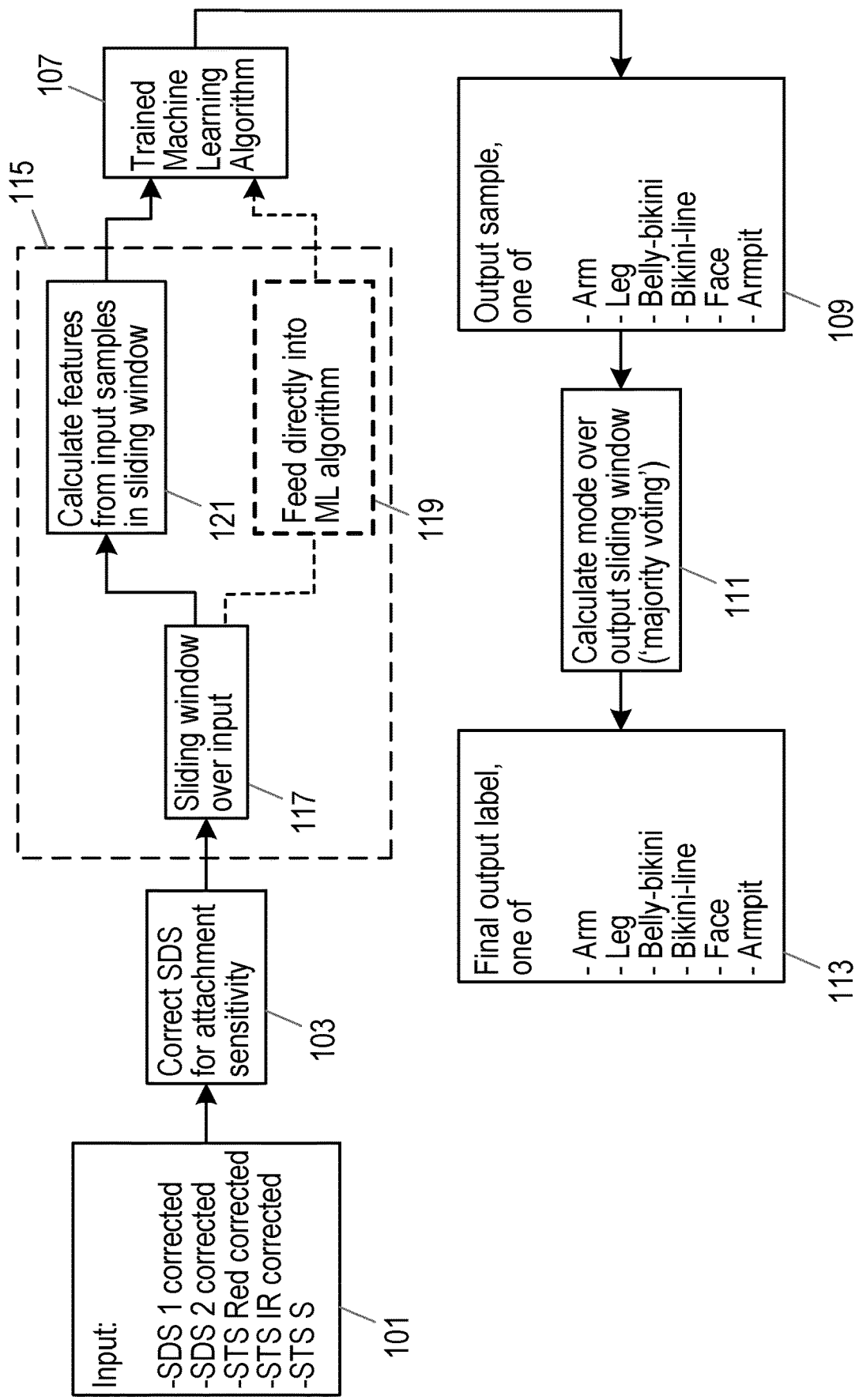

In the following, a 'per sample' body part classification is evaluated as well as a classification based on 'temporal features' in the measurement signals. The flow charts in FIG. 7 show how the measurement signals are analysed in the two cases, with FIG. 7(a) relating to a per-sample classification and FIG. 7(b) relating to a temporal feature classification. Steps that are common to both methods are labelled with the same reference numeral.

In both methods, the measurement signals SDS1, SDS2, STSRed, STSIR and STSS are obtained (step 101) and corrected for bias or background light as appropriate. In step 103 the skin contact sensor measurement signals SDS1 and SDS2 are corrected for the attachment that was used on the photoepilator. In particular, at least a part of the skin contact sensors 14, 16 are located on the removable attachment (e.g. the electrodes) and so the sensitivity of the skin contact sensors 14, 16 can depend on the type of attachment used due to physical differences in the capacitive electrodes or plates on the different attachments. In some embodiments, the hand-held device 2, 32 can detect the type of attachment that is connected to the hand-held device 2, 32, e.g. based on information (e.g. a signal) obtained from the removable attachment when it is connected, and make the appropriate correction or adjustment. This correction due to the attachment is described in more detail below.

Subsequently, for the 'per sample' classification shown in FIG. 7(a), measurement samples for which the SDS1 and SDS2 are above the skin contact threshold are filtered out (step 105) and fed to the classifier (trained machine learning algorithm/model)—step 107.

As expected, when the measurement samples for which SDS1 and SDS2 is below the skin contact threshold are used in the classification, the accuracy of the classification reduces. This is due to the skin contact measurement signals being rather similar (and close to 0) for different body parts when there is no skin contact.

In step 107, the classifier takes in one measurement sample and based on that, outputs, at the same sampling rate, one sample indicating the body part (step 109). In the method of FIG. 7(a), any temporal behaviour of the measurement signals that may correlate with the treated body part can thus not be taken into account.

The classification performance can be increased by aggregating the output sample using mode filtering. Thus, the sample indicating the body part identified by the classifier is subsequently provided to a mode filtering step, step 111, and a sliding window is applied to the output of the trained machine learning algorithm. The mode (i.e. the body part occurring most frequently in the sliding window) is determined and output as the final identified body part in step 113. It should be noted that a sample representing the final identified body part can still be output at the same rate as the measurement samples are input if the mode filtering uses a 'per-one-sample' sliding window. The increase in performance by using mode filtering is due to the actually-treated body part not changing rapidly. Thus, the classifier only then has to identify the right body part most of the time, and so occasional misclassifications of the body part are filtered out.

For the classification based on 'temporal features' shown in FIG. 7(b), after step 103, a different filtering process is applied (block 115), and no skin contact filtering/threshold is applied. In step 117 of block 115, a sliding window is applied to the input measurement signals to select a subset of the measurement samples. Depending on the machine learning model being used, either in step 119 of block 115 the measurement samples in the sliding input window are directly fed into the machine learning algorithm in step 107, or in step 121 of block 115 features are calculated from the measurement samples in the sliding input window and fed into the machine learning algorithm in step 107. In the following discussion, the MLM can be an artificial neural network in which case step 119 applies (so the measurement samples are fed straight to the MLM), or the MLM can be a random forest in which case step 121 applies, and a plurality of features are calculated from the measurement samples in the sliding input window. Steps 107-113 of FIG. 7(b) are the same as the per-sample classification approach in FIG. 7(a). Thus, output mode filtering is applied to the output of the trained machine learning algorithm to derive the final output body part.

As noted above for the classification two different supervised machine learning models are employed: a random forest and an (artificial) neural network. Both models are able to model complex non-linear transfer functions.

Figure 8:
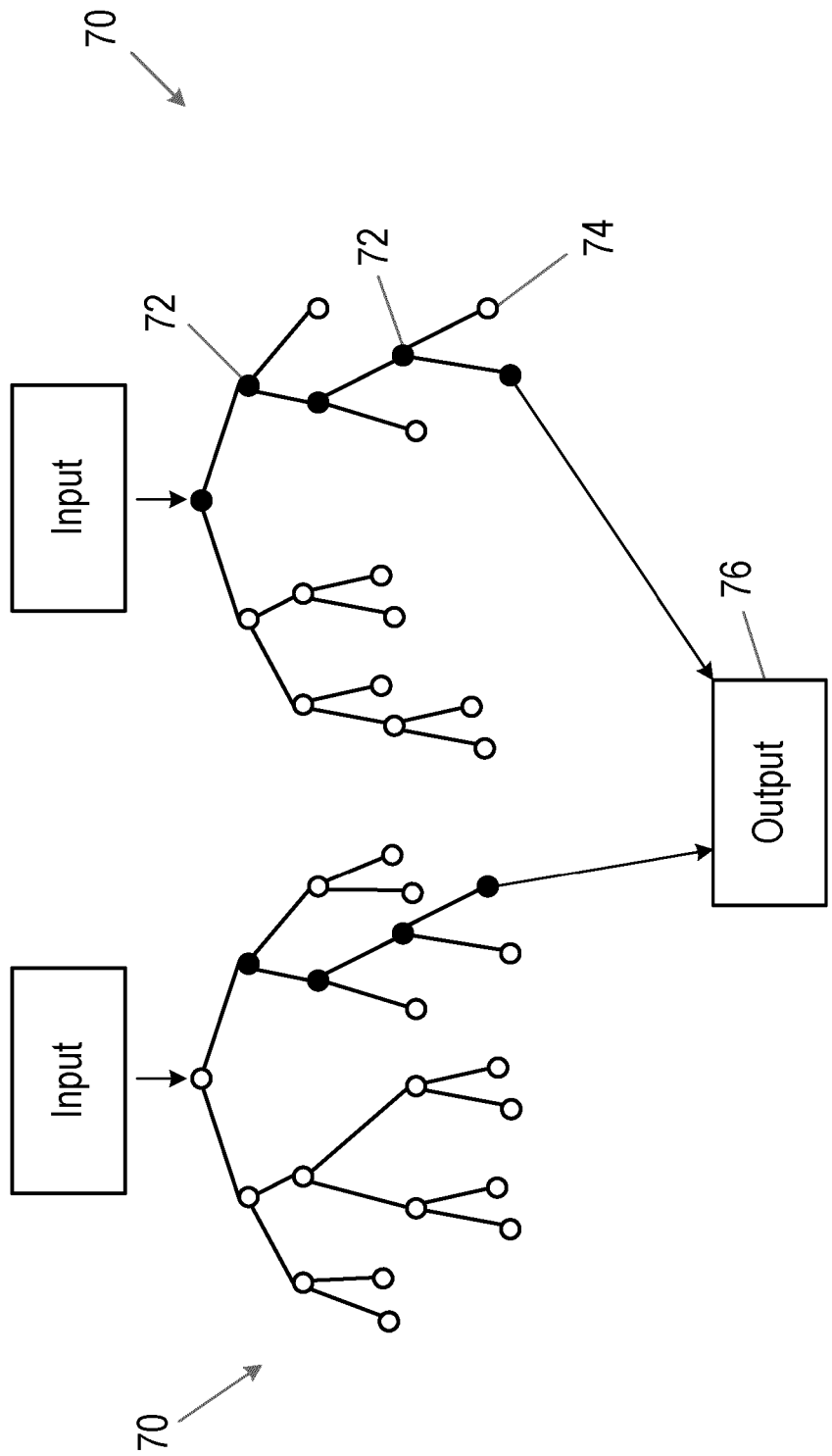
FIG. 8 illustrates an exemplary structure of a random forest classifier.

A random forest classifier is an ensemble of decision trees 70, as shown in FIG. 8. Each decision tree 70 consists of decision nodes 72 at which a simple comparison between one of the input feature values (e.g. minimum) and a number is performed. By running through all the decision nodes 72 an end node 74 is eventually reached corresponding to an output classification (e.g. an identified body part) for the decision tree 70. As a single decision tree 70 typically has a tendency to 'overfit' the data, multiple decision trees 70 can be trained and used to mitigate this. Here, for training of a single decision tree 70, measurement samples are randomly sampled with replacement (so called bootstrapping). Furthermore, a random subset of the input features (e.g. minimum) is used at each decision node 72. The output 76 of the random forest can be obtained as the mode (i.e. most occurring) output from the decision trees 70. An advantage of using a random forest classifier is that there is a relatively low number of features that can/need to be tuned, and that the output of the random forest is relatively insensitive to these features. Furthermore, insight into the 'decision process' of a trained random forest classifier can easily be obtained by simply visualising the decision trees, and so the relative importance of the input features can be readily deduced. For the results discussed further below, both Matlab (TreeBagger class) and Python (sklearn.ensemble.RandomForestClassifier class) implementations of a random forest have been used.

Figure 9:
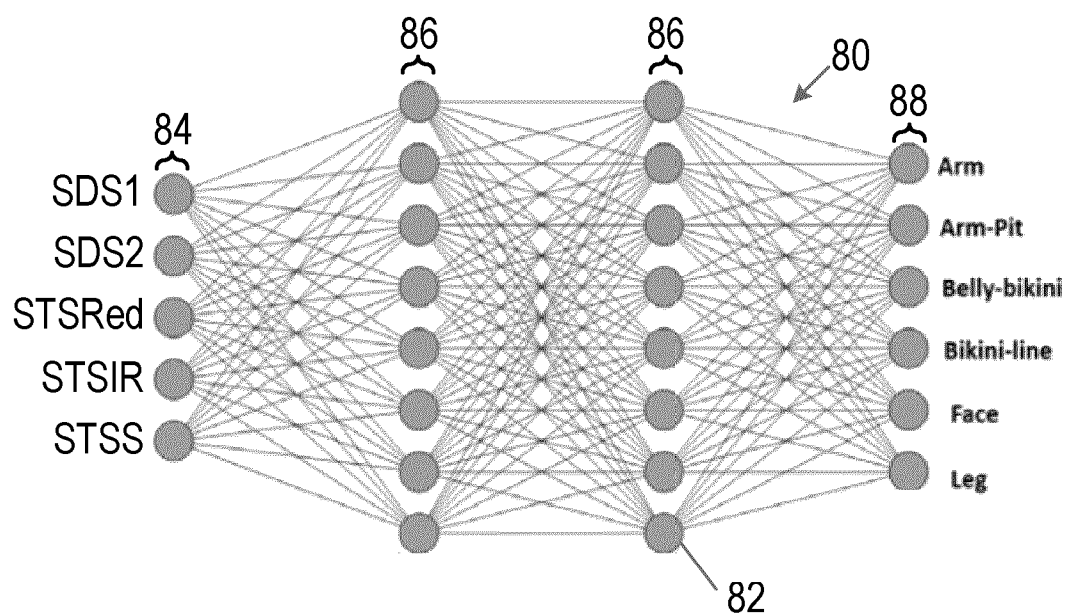
FIG. 9 illustrates an exemplary structure of an artificial neural network.
Figure 10A:
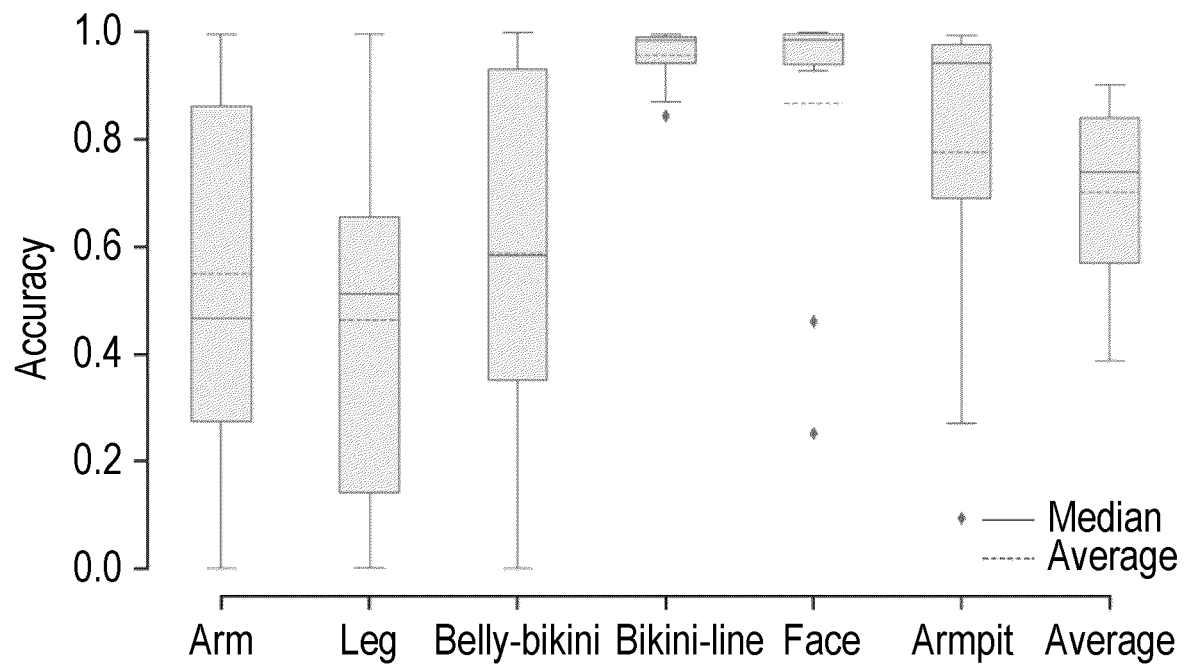
FIGS. 10-13 show classification results for a random forest classifier and an artificial neural network that are generalised and personalised.
Figure 10B:
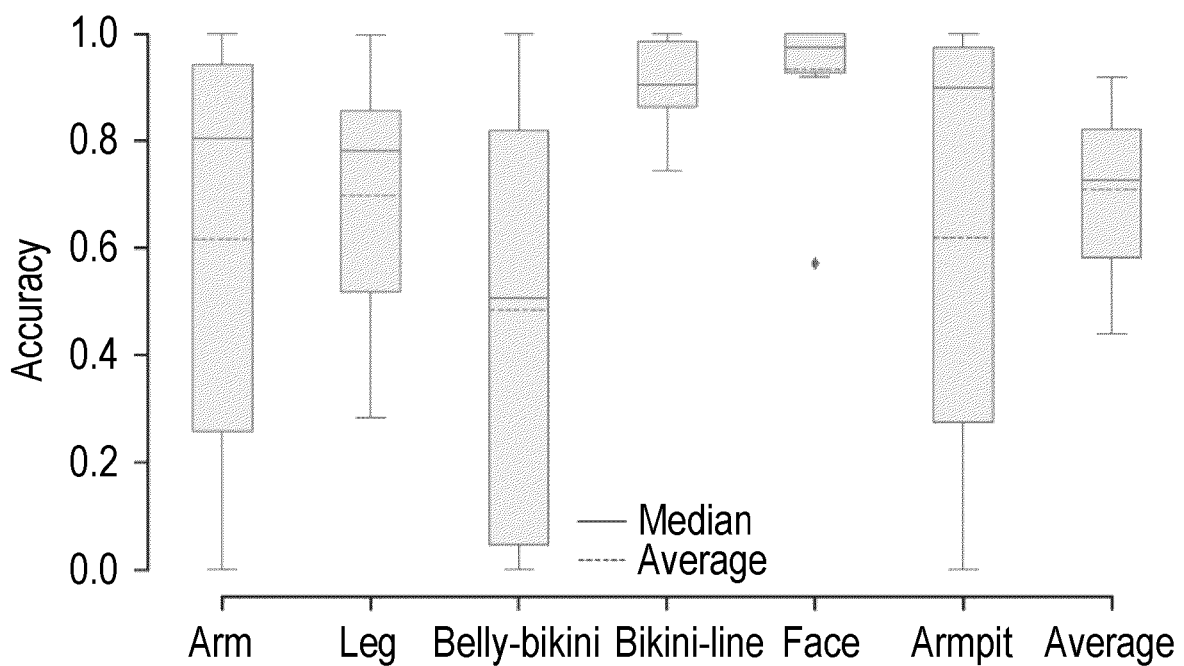
Figure 11A:
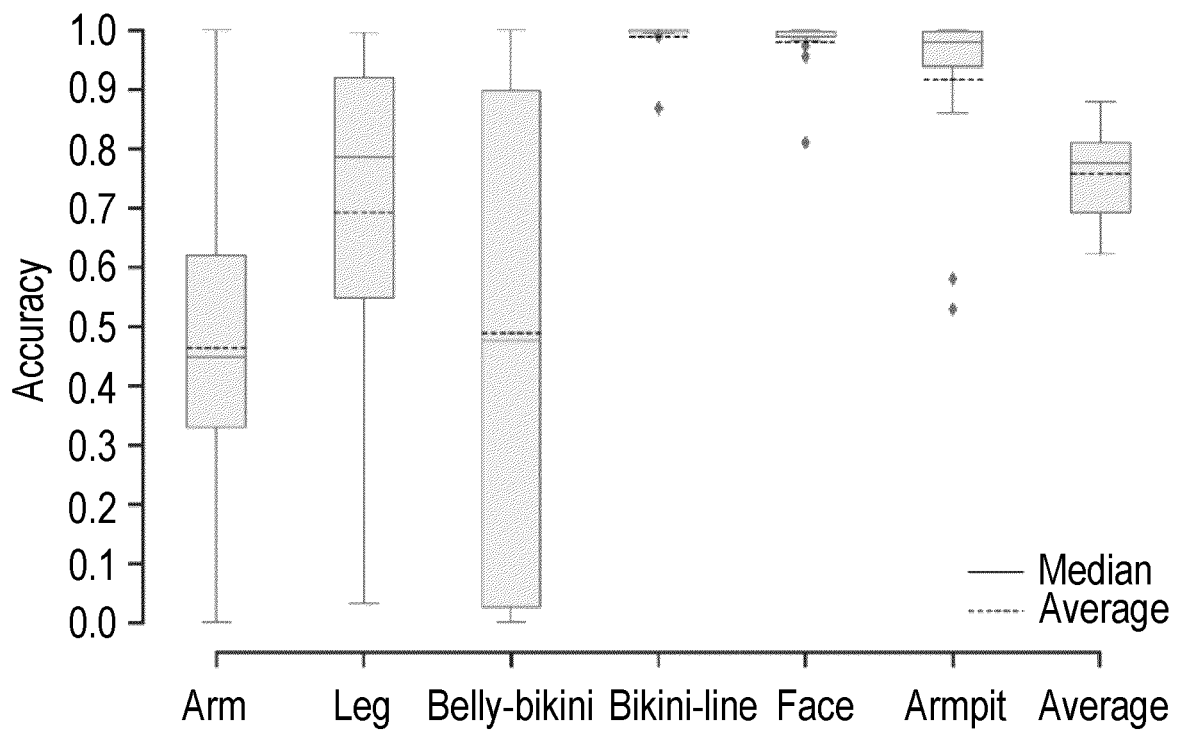
Figure 11B:
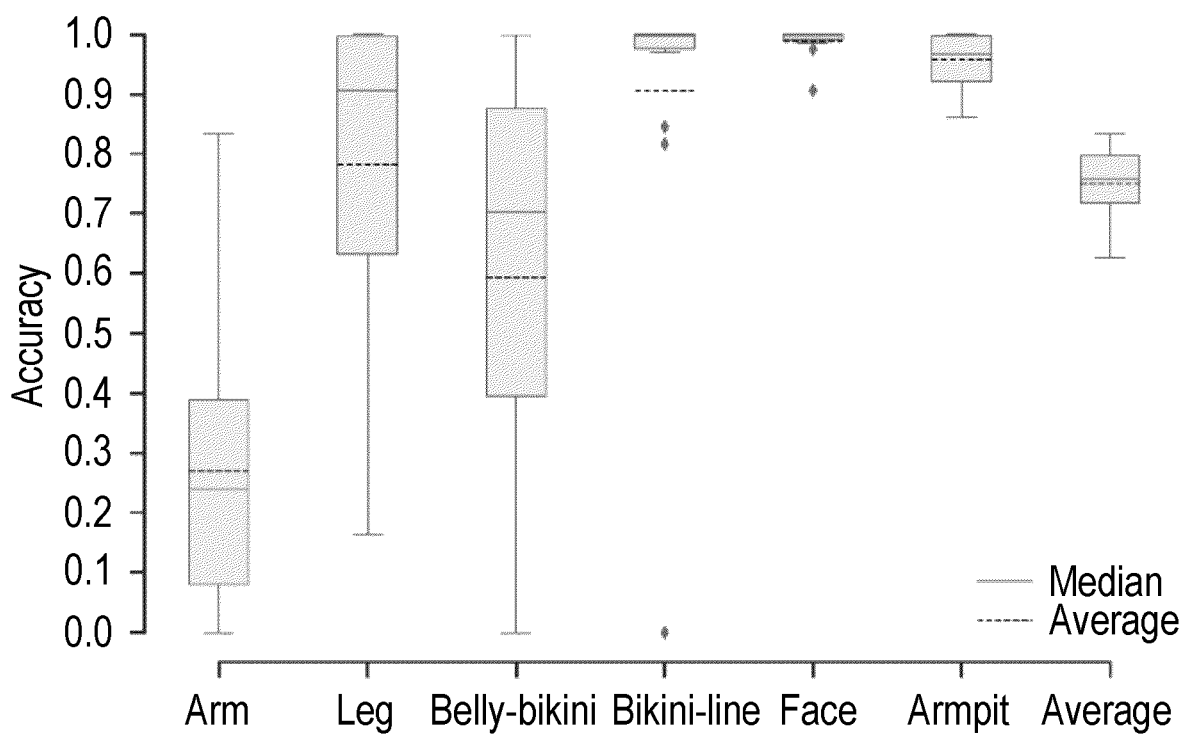

An artificial neural network 80 as shown in FIG. 9 consists of nodes 82 (or neurons) arranged in an input layer 84, one or more hidden layers 86, and an output layer 88. Each node 82 in the input layer 84 represents a respective input value, which in this case is a respective windowed part of SDS1, SDS2, STSRed, STSIR or STSS, and each node 82 in the output layer 88 represents a respective one of the different classes, which in this case are the body parts. In a fully connected network, as shown in FIG. 9, the lines leading from each node 82 in one layer are connected to each of the nodes 82 in a neighbouring layer(s). In a forward-pass, each neuron 82 in a hidden layer 86 takes a linear combination of the values of the nodes 82 at the previous layer 84/86, inputs this into an activation function, and outputs the activation to the nodes 82 in the next layer. The activations are propagated in this fashion until the output layer 88. At the output layer 88 the neuron 82 with highest activation is selected as the predicted body part. The goal when training the artificial neural network is to learn the weights for the linear combinations at each node 82 which results in the least disparity between the predicted body part and the actual body part. To achieve this, the output layer 88 can be compared against the expected values and the weights can be adapted using gradient descent. The adaption can be back-propagated through each layer resulting in a backward pass. The forward and backward passes can then be repeated multiple times until the weights converge to their final values. For the results discussed further below Tensorflow in a Python programming environment is used for the artificial neural network.

For the estimation of the performance of the applied MLMs as set out below, cross validation has been applied. This means that the MLM is trained with only a part of the training data shown in Table 4 above. This part of the training data is referred to as the 'training set'. The predictive performance of the trained MLM is then subsequently assessed using the rest of the training data (i.e. which is 'unseen' in the training of the model). This other part of the training data is referred to as the 'test set'. In the current analysis leave-one-out cross validation has been used in two different schemes.

The first scheme is a generalised model in which a 'leave-one-subject-out' cross validation is employed. This means that the MLM is trained using the data of 14 out of the 15 subjects. The trained MLM is subsequently used to obtain predictions for the subject whose measurement signals were not used in the training. This procedure is carried out for each subject separately (thus 15 times). In this way for all subjects 'test model predictions' are obtained. The performance of the trained MLM can be assessed on the whole study population. For instance, the fraction of correctly classified measurement samples can be calculated taking into account all measurement samples for all subjects. Performance per subject can also be assessed to get an idea of subject-to-subject variation. This first scheme is relevant when a single 'one size fits all' machine learned classifier is employed for body part detection.

The second scheme is a personalised model in which for each subject separately a 'leave-one-session-out' cross validation is employed. Thus per personal care session of a subject, 'test predictions' are obtained by using a MLM trained on the data of the other personal care sessions of that same subject. Prediction performance can subsequently be assessed per subject and/or for the whole study population. This approach is relevant for investigating the feasibility of employing a MLM tailored to one specific subject. The disadvantage of such an implementation is that a calibration procedure needs to be performed: i.e. for training the classifier for an individual subject, data from one or more personal care sessions in which the treated body area is known would have to be obtained. However, classification performance is generally better than for a generalised implementation.

It should be noted that random sample cross validation has not been considered, which is a cross validation where at random a fraction of samples (across subjects and/or sessions) is used as the training set and the other fraction is used as the test set. For a generalised MLM this would give an inaccurate estimate of performance as measurement signals for each subject will be partly in the training set, and testing on a new 'not seen before' subject is thus not performed. For a personalised classifier possible variations between personal care sessions that affect predictive performance are not covered when applying a random sample cross validation.

Table 5 below shows an overview of the classification accuracies obtained for the different MLMs. Here, for each subject the classification accuracy is calculated as the percentage of correctly classified samples (thus for all body parts). Subsequently, the average and standard deviation over these values is taken and are indicated in Table 5. The results are obtained with application of output mode filtering (step 111 of FIGS. 7(*a*) and 7(*b*)) having a window length that is optimised for classification performance. This window length is between about 50 and 100 measurement samples, depending on the applied validation, machine learning model and processing methods. The effect of the output mode filtering on average accuracy is 5% in all cases. For the temporal features processing an input window length of about 50 samples (step 117) is applied.

TABLE 5

| Validation | Machine learning method | Processing | Classification accuracy, average ± standard deviation |
|---|---|---|---|
| Generalised | Random Forest | Per sample | (70 ± 17) % |
| | | Temporal features | (71 ± 16) % |
| | Neural Network | Per sample | (76 ± 8) % |
| | | Temporal features | (75 ± 7) % |
| Personalised | Random Forest | Per sample | (84 ± 9) % |
| | | Temporal features | (89 ± 7) % |
| | Neural Network | Per sample | (86 ± 9) % |
| | | Temporal features | (84 ± 11) % |

It can be seen from Table 5 that the personalised models have a 10 to 15% higher average accuracy than the generalised models. Also, the personalised models typically provide a lower variation in accuracy, although based on standard deviation values this is not apparent for all cases. However, more detailed results are discussed below.

Mainly for the generalised models, the neural network performs a better than the random forest (5% better). However this is mainly due to a better performance for identifying the armpit as will be discussed below. For the generalised models, the neural network and the random forest perform more similarly, with some advantages of the random forest with temporal features processing.

Classification accuracy appears to be similar for per-sample and temporal features processing, except for the personalised random forest model, for which the temporal features processing provides a higher accuracy.

Figure 12A:
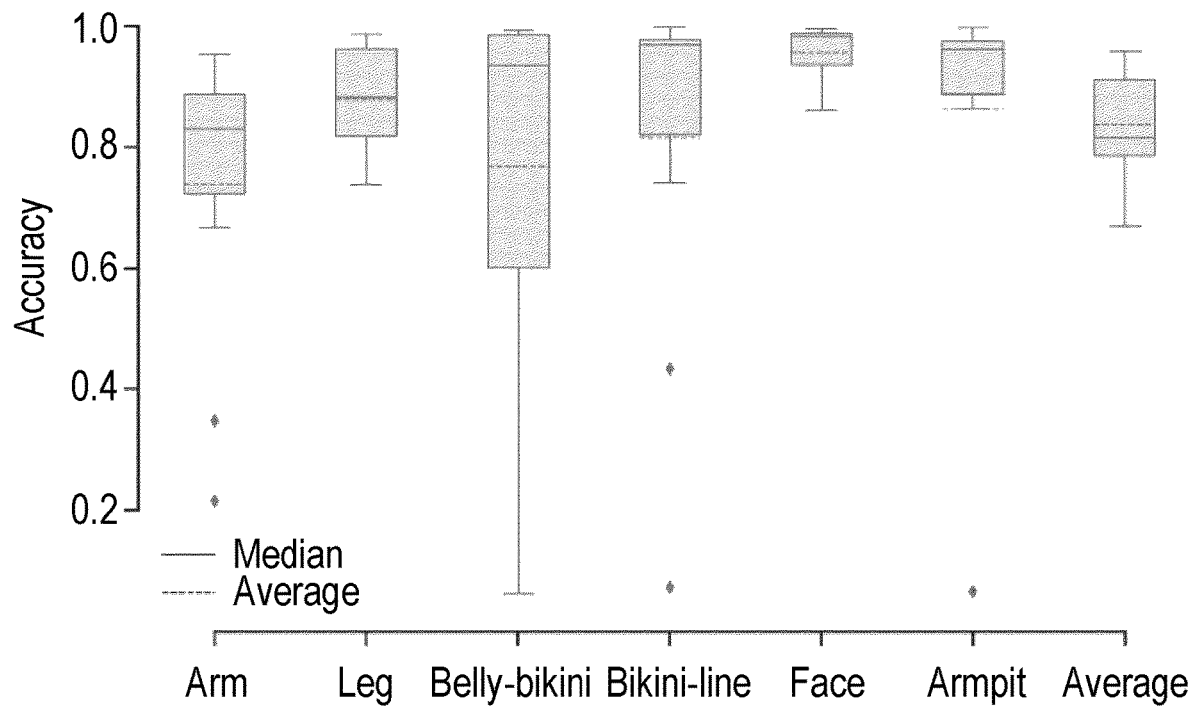
Figure 12B:
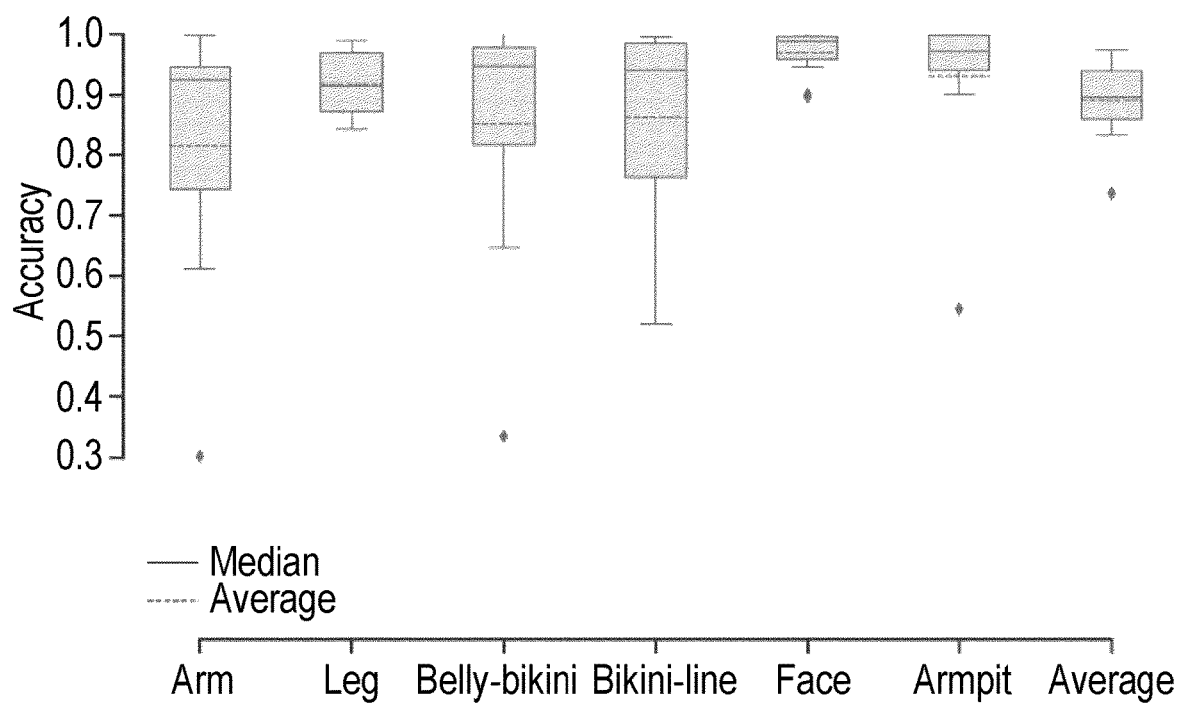
Figure 13A:
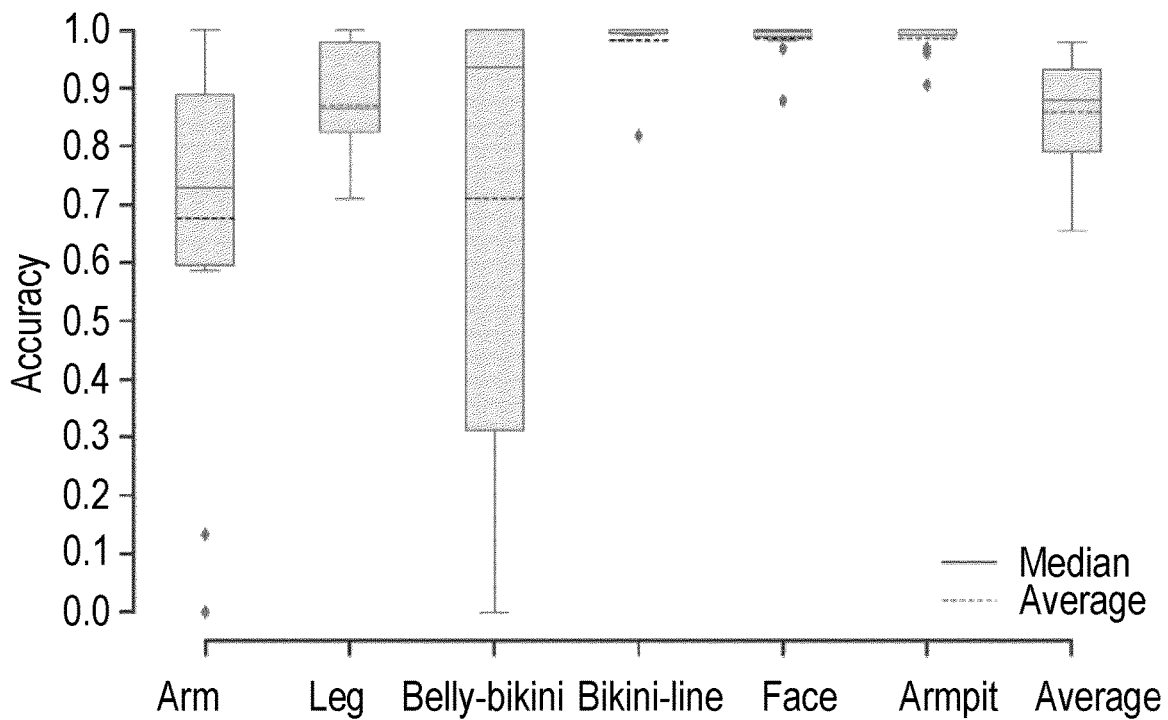
Figure 13B:
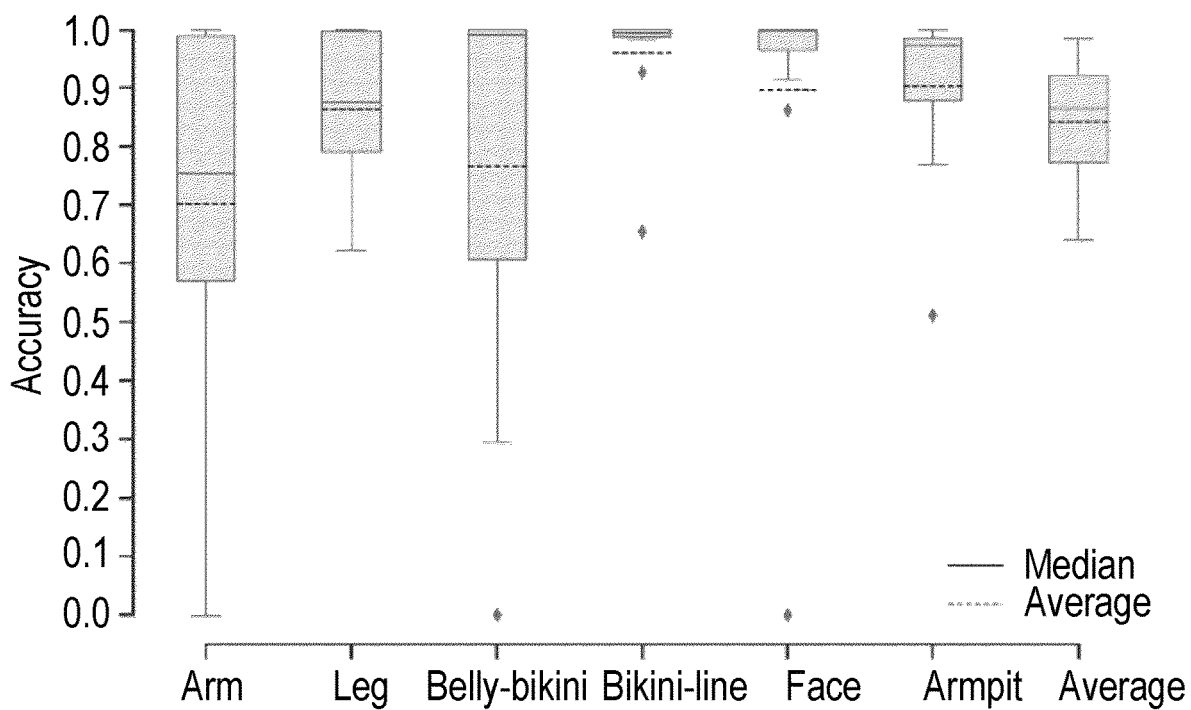

More detailed results for the classification are shown in FIGS. 10-13 for the generalised random forest (FIG. 10), generalised neural network (FIG. 11), personalised random forest (FIG. 12), and personalised neural network (FIG. 13). In these figures, for each body part the distribution of accuracies obtained for the different subjects is indicated by a box plot. In addition, the distribution over subjects 'body-parts averaged' accuracy is indicated by the box plot labelled 'average'. The box plot (a) in each of FIGS. 10-13 relates to the accuracy obtained when using per-sample processing, and the box plot (b) in each of FIGS. 10-13 relates to the accuracy obtained when using temporal features processing.

It can be seen that for the bikini-line, face and armpit the accuracy is usually the highest, whereas for the arm, leg, and belly-bikini the accuracy is notably lower. This is most apparent for the neural network models. It should be noted that the bikini-line, face and armpit can be (and were when the training measurement signals were obtained) treated with their own dedicated attachment on the hand-held device 2, 32, whereas the arm, leg and belly-bikini are treated using a general body attachment. As noted above, the sensitivity of the skin contact sensors 14, 16 can depend on the attachment type, and this has been corrected for in the results displayed. Therefore, classification based on attachment type rather than body part has been ruled out as much as possible. The presence of a bias in the classification accuracy due to attachment type (i.e. when no correction is made for the skin contact sensor sensitivity) is discussed further below.

For the generalised models it can be seen in FIGS. 10-13 that the accuracy variation is very large, especially for the arm, leg and belly-bikini. Overall, for the personalised models the accuracy variation is much smaller, with a minimum accuracy of 50% possible for all body parts/subjects with the random forest temporal features model (except for a few outliers).

Figure 14:
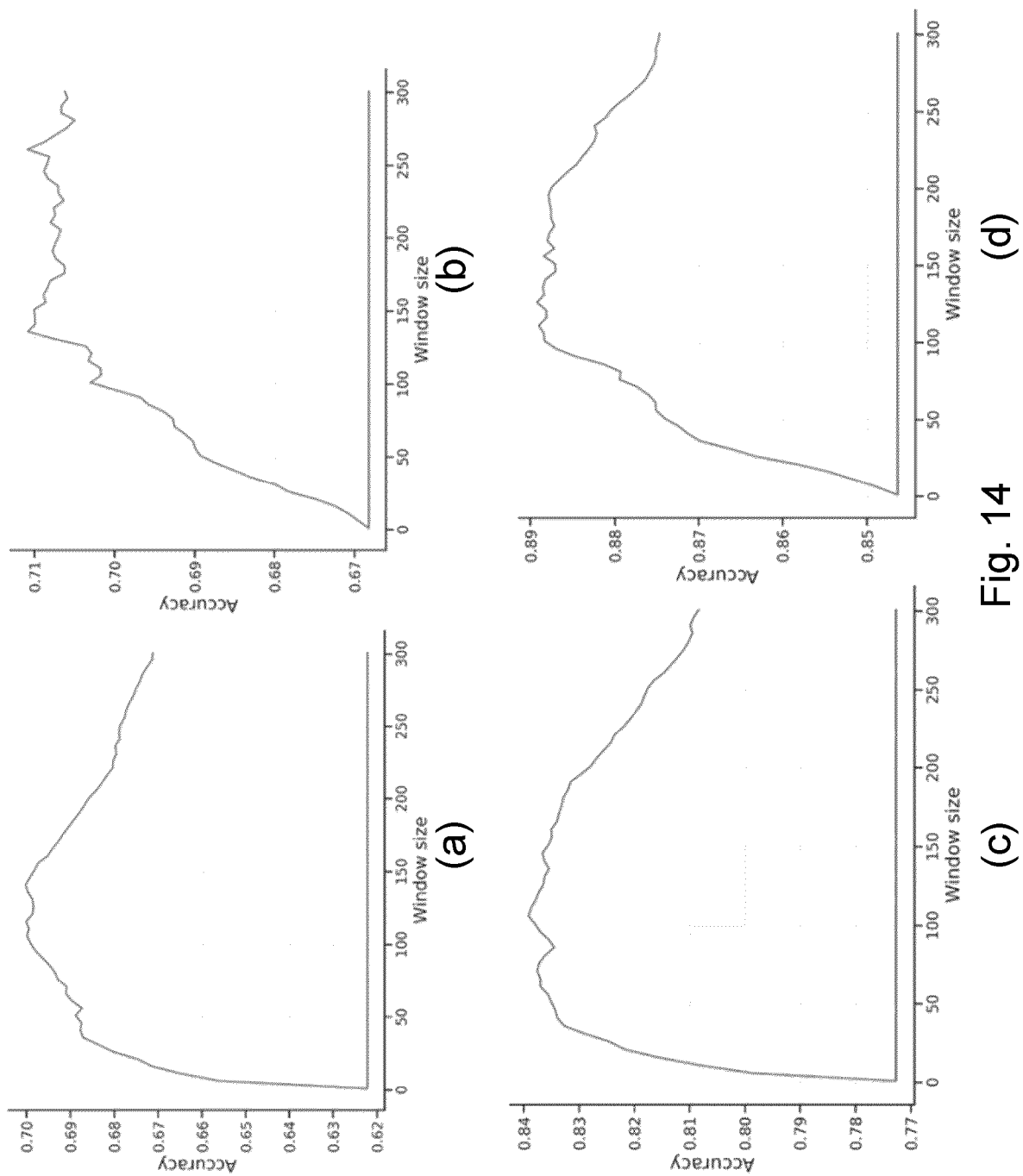
FIG. 14 shows the effect of the application of output mode filtering on the accuracy of four different implementations of the random forest model.

The effect of the application of the output mode filtering in step 111 (which is used to arrive at the results discussed above) on the random forest models is demonstrated by the plots in FIG. 14. Each plot shows the average classification accuracy versus the length of the output mode filtering window. FIG. 14(a) relates to the generalised model with per-sample processing, FIG. 14(b) relates to the generalised model with temporal features processing, FIG. 14(c) relates to the personalised model with per-sample processing, and FIG. 14(d) relates to the personalised model with temporal features processing. Overall, an increase in accuracy of 4 to 7% can be obtained by increasing the window length from 50 to 150 samples. For the neural network models similar results are obtained.

Tables 6-13 show the confusion matrices for all 15 subjects for the generalised random forest, generalised neural network model, personalised random forest and personalised neural network model for both per-sample and temporal feature processing. The confusion matrices depict for each actual body part (along the rows of the tables) the fraction of samples for which a specific body part is outputted by the classifier (along the columns of the tables). The diagonal of each table provides the classification accuracy for the different body parts.

TABLE 6

| Actual | Prediction | | | | | |
|---|---|---|---|---|---|---|
| | Arm | Leg | Belly-bikini | Bikini-line | Face | Armpit |
| Arm | 0.57 | 0.01 | 0.08 | 0.00 | 0.00 | 0.34 |
| Leg | 0.00 | 0.78 | 0.06 | 0.13 | 0.00 | 0.03 |
| Belly-bikini | 0.21 | 0.03 | 0.56 | 0.00 | 0.05 | 0.15 |
| Bikini-line | 0.00 | 0.02 | 0.01 | 0.96 | 0.00 | 0.01 |
| Face | 0.05 | 0.04 | 0.06 | 0.00 | 0.85 | 0.0 |
| Armpit | 0.42 | 0.00 | 0.16 | 0.00 | 0.02 | 0.39 |

Average accuracy: 0.70

Table 6 shows the confusion matrix for the generalised random forest classifier with per-sample processing.

TABLE 7

| Actual | Prediction | | | | | |
|---|---|---|---|---|---|---|
| | Arm | Leg | Belly-bikini | Bikini-line | Face | Armpit |
| Arm | 0.50 | 0.41 | 0.07 | 0.0 | 0.01 | 0.01 |
| Leg | 0.22 | 0.64 | 0.13 | 0.0 | 0.01 | 0.01 |
| Belly-bikini | 0.11 | 0.38 | 0.45 | 0.03 | 0.0 | 0.03 |
| Bikini-line | 0.0 | 0.01 | 0.0 | 0.99 | 0.0 | 0.0 |
| Face | 0.0 | 0.01 | 0.0 | 0.0 | 0.99 | 0.0 |
| Armpit | 0.0 | 0.01 | 0.01 | 0.01 | 0.0 | 0.97 |

Average accuracy: 0.76

Table 7 shows the confusion matrix for the generalised neural network classifier with per-sample processing.

TABLE 8

| Actual | Prediction | | | | | |
|---|---|---|---|---|---|---|
| | Arm | Leg | Belly-bikini | Bikini-line | Face | Armpit |
| Arm | 0.68 | 0.03 | 0.05 | 0.02 | 0.01 | 0.22 |
| Leg | 0.01 | 0.88 | 0.01 | 0.01 | 0.01 | 0.08 |
| Belly-bikini | 0.04 | 0.00 | 0.79 | 0.01 | 0.03 | 0.13 |
| Bikini-line | 0.01 | 0.16 | 0.00 | 0.83 | 0.00 | 0.00 |
| Face | 0.01 | 0.01 | 0.00 | 0.00 | 0.97 | 0.01 |
| Armpit | 0.06 | 0.01 | 0.06 | 0.00 | 0.01 | 0.86 |

Average accuracy: 0.84

Table 8 shows the confusion matrix for the personalised random forest classifier with per-sample processing.

TABLE 9

| Actual | Prediction | | | | | |
|---|---|---|---|---|---|---|
| | Arm | Leg | Belly-bikini | Bikini-line | Face | Armpit |
| Arm | 0.61 | 0.28 | 0.05 | 0.0 | 0.01 | 0.05 |
| Leg | 0.06 | 0.86 | 0.07 | 0.0 | 0.01 | 0.01 |
| Belly-bikini | 0.07 | 0.12 | 0.74 | 0.01 | 0.0 | 0.06 |
| Bikini-line | 0.0 | 0.02 | 0.0 | 0.98 | 0.0 | 0.0 |
| Face | 0.0 | 0.01 | 0.0 | 0.0 | 0.99 | 0.0 |
| Armpit | 0.01 | 0.0 | 0.0 | 0.0 | 0.0 | 0.99 |

Average accuracy: 0.86

Table 9 shows the confusion matrix for the personalised neural network classifier with per-sample processing.

TABLE 10

| Actual | Prediction | | | | | |
|---|---|---|---|---|---|---|
| | Arm | Leg | Belly-bikini | Bikini-line | Face | Armpit |
| Arm | 0.65 | 0.00 | 0.03 | 0.00 | 0.00 | 0.32 |
| Leg | 0.02 | 0.69 | 0.08 | 0.08 | 0.03 | 0.10 |
| Belly-bikini | 0.15 | 0.05 | 0.46 | 0.00 | 0.09 | 0.24 |
| Bikini-line | 0.01 | 0.05 | 0.01 | 0.90 | 0.01 | 0.02 |
| Face | 0.00 | 0.00 | 0.05 | 0.01 | 0.93 | 0.01 |
| Armpit | 0.26 | 0.00 | 0.09 | 0.01 | 0.01 | 0.62 |

Average accuracy: 0.71

Table 10 shows the confusion matrix for the generalised random forest classifier with temporal features processing.

TABLE 11

| Actual | Prediction | | | | | |
|---|---|---|---|---|---|---|
| | Arm | Leg | Belly-bikini | Bikini-line | Face | Armpit |
| Arm | 0.30 | 0.56 | 0.08 | 0.0 | 0.04 | 0.01 |
| Leg | 0.1 | 0.74 | 0.14 | 0.0 | 0.01 | 0.0 |
| Belly-bikini | 0.02 | 0.32 | 0.58 | 0.03 | 0.03 | 0.02 |
| Bikini-line | 0.0 | 0.0 | 0.0 | 0.90 | 0.0 | 0.1 |
| Face | 0.0 | 0.01 | 0.0 | 0.0 | 0.99 | 0.0 |
| Armpit | 0.0 | 0.01 | 0.0 | 0.02 | 0.01 | 0.96 |

Average accuracy: 0.75

Table 11 shows the confusion matrix for the generalised neural network classifier with temporal features processing.

TABLE 12

| Actual | Prediction | | | | | |
|---|---|---|---|---|---|---|
| | Arm | Leg | Belly-bikini | Bikini-line | Face | Armpit |
| Arm | 0.77 | 0.00 | 0.01 | 0.03 | 0.00 | 0.19 |
| Leg | 0.01 | 0.94 | 0.01 | 0.03 | 0.00 | 0.00 |
| Belly-bikini | 0.02 | 0.01 | 0.87 | 0.00 | 0.00 | 0.10 |
| Bikini-line | 0.00 | 0.11 | 0.02 | 0.86 | 0.00 | 0.01 |
| Face | 0.00 | 0.01 | 0.00 | 0.01 | 0.98 | 0.00 |
| Armpit | 0.03 | 0.00 | 0.04 | 0.02 | 0.01 | 0.91 |

Average accuracy: 0.89

Table 12 shows the confusion matrix for the personalised random forest classifier with temporal features processing.

TABLE 13

| Actual | Prediction | | | | | |
|---|---|---|---|---|---|---|
| | Arm | Leg | Belly-bikini | Bikini-line | Face | Armpit |
| Arm | 0.65 | 0.25 | 0.06 | 0.0 | 0.02 | 0.03 |
| Leg | 0.07 | 0.83 | 0.05 | 0.0 | 0.03 | 0.07 |
| Belly-bikini | 0.08 | 0.08 | 0.78 | 0.01 | 0.01 | 0.04 |
| Bikini-line | 0.0 | 0.0 | 0.0 | 0.97 | 0.0 | 0.03 |
| Face | 0.01 | 0.01 | 0.0 | 0.03 | 0.95 | 0.00 |
| Armpit | 0.01 | 0.03 | 0.03 | 0.01 | 0.00 | 0.93 |

Average accuracy: 0.85

Table 13 shows the confusion matrix for the generalised random forest classifier with temporal features processing.

As noted above, for some hand-held devices 2, 32, body parts such as the arm, leg and belly-bikini can be treated using a general body attachment on the hand-held device 2, 32 that is non-specific to those body parts, whereas other body parts such as the bikini-line, face and armpit can be treated using their own dedicated attachment. For skin contact sensors 14, 16 that are based on capacitance, systematic differences in the response between the part of the skin contact sensor present on the attachment can be present due to differences in dimensions and/or the amount of metal used. Furthermore, random variation can be expected for both skin contact sensors and skin tone sensor sensors due to manufacturing reproducibility.

In obtaining the results discussed above, the systematic differences in skin contact sensor sensitivity between different attachments has been corrected. The corrections are based on tests of the response of skin contact sensors for different attachments when placed into contact with copper. These results are shown in Table 14 below.

TABLE 14

| | Average response value - full contact with copper | |
|---|---|---|
| Attachment | SDS1 | SDS2 |
| Body | 64.4 | 61.6 |
| Bikini-line | 57.7 | 53.4 |
| Face | 52.5 | 44.7 |
| Armpit | 56.3 | 52.0 |

It can be seen in Table 14 that, in addition to a systematic difference between attachment types, there is also a systematic difference between SDS1 and SDS2 (i.e. response SDS1>response SDS2). In classification results presented above, the skin contact measurement signals are divided by the sensitivities given in Table 14.

Figure 15:
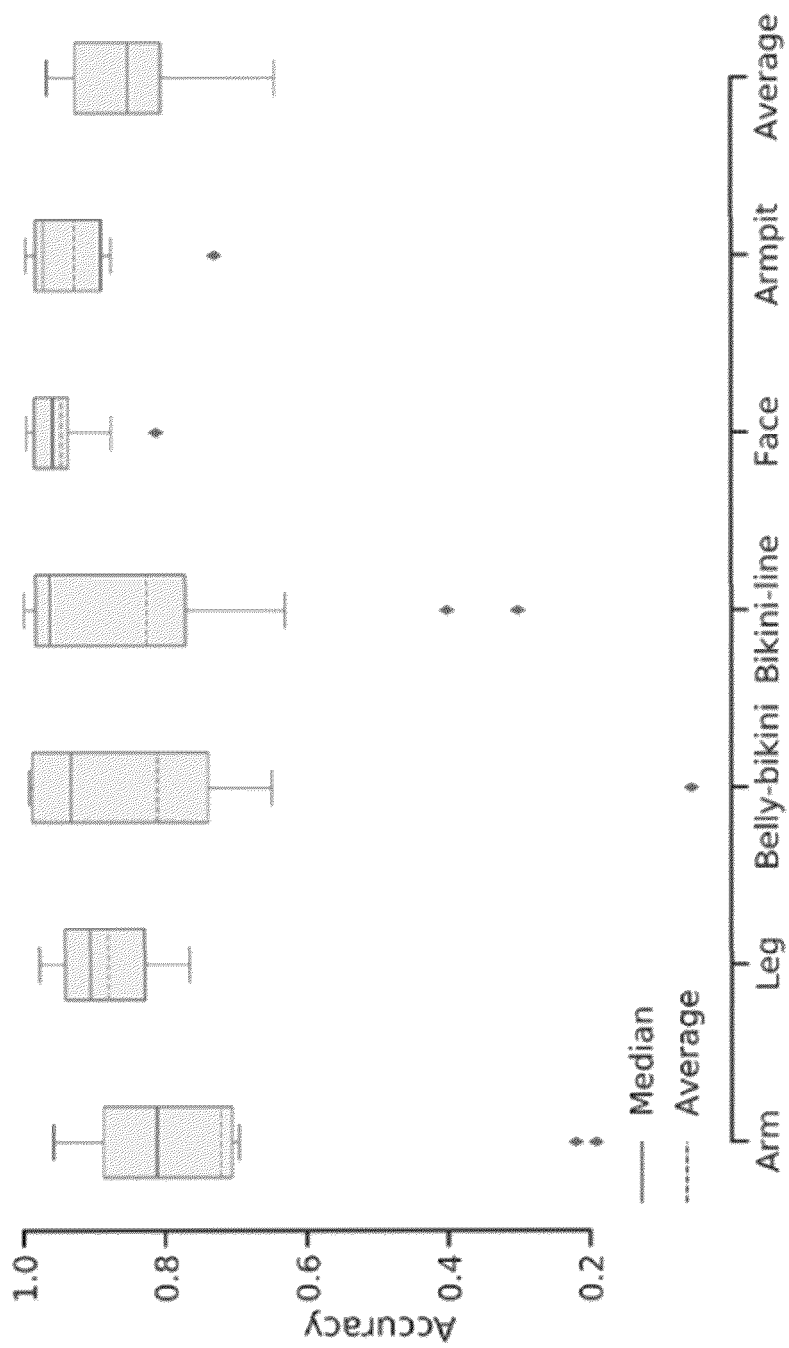
FIG. 15 is an accuracy box plot obtained for a random forest classification where skin contact measurement signals are not corrected for variability between attachments.

The confusion matrix shown in Table 15 below and the accuracy box plot in FIG. 15 show the effect of not correcting for the attachment dependent skin contact sensor sensitivity for the personalised random forest classification with per-sample processing, to illustrate the possible effect of attachment bias. Thus, the MLM is trained using training data in which the skin contact measurement signals are not corrected for skin contact sensor variability between attachments, and the validation is likewise performed with uncorrected skin contact measurement signals.

TABLE 15

| Actual | Prediction | | | | | |
|---|---|---|---|---|---|---|
| | Arm | Leg | Belly-bikini | Bikini-line | Face | Armpit |
| Arm | 0.66 | 0.02 | 0.04 | 0.01 | 0.00 | 0.27 |
| Leg | 0.01 | 0.94 | 0.00 | 0.01 | 0.01 | 0.03 |
| Belly-bikini | 0.03 | 0.00 | 0.83 | 0.00 | 0.01 | 0.13 |
| Bikini-line | 0.00 | 0.15 | 0.00 | 0.84 | 0.00 | 0.00 |
| Face | 0.01 | 0.01 | 0.00 | 0.00 | 0.96 | 0.02 |
| Armpit | 0.08 | 0.00 | 0.05 | 0.00 | 0.01 | 0.86 |

Average accuracy: 0.84

A comparison of the results shown in Table 15 and FIG. 15 with the results shown in Table 8 and FIG. 12 (which used corrected skin contact measurement signals), shows that the overall classification performance is not much affected.

Figure 16:
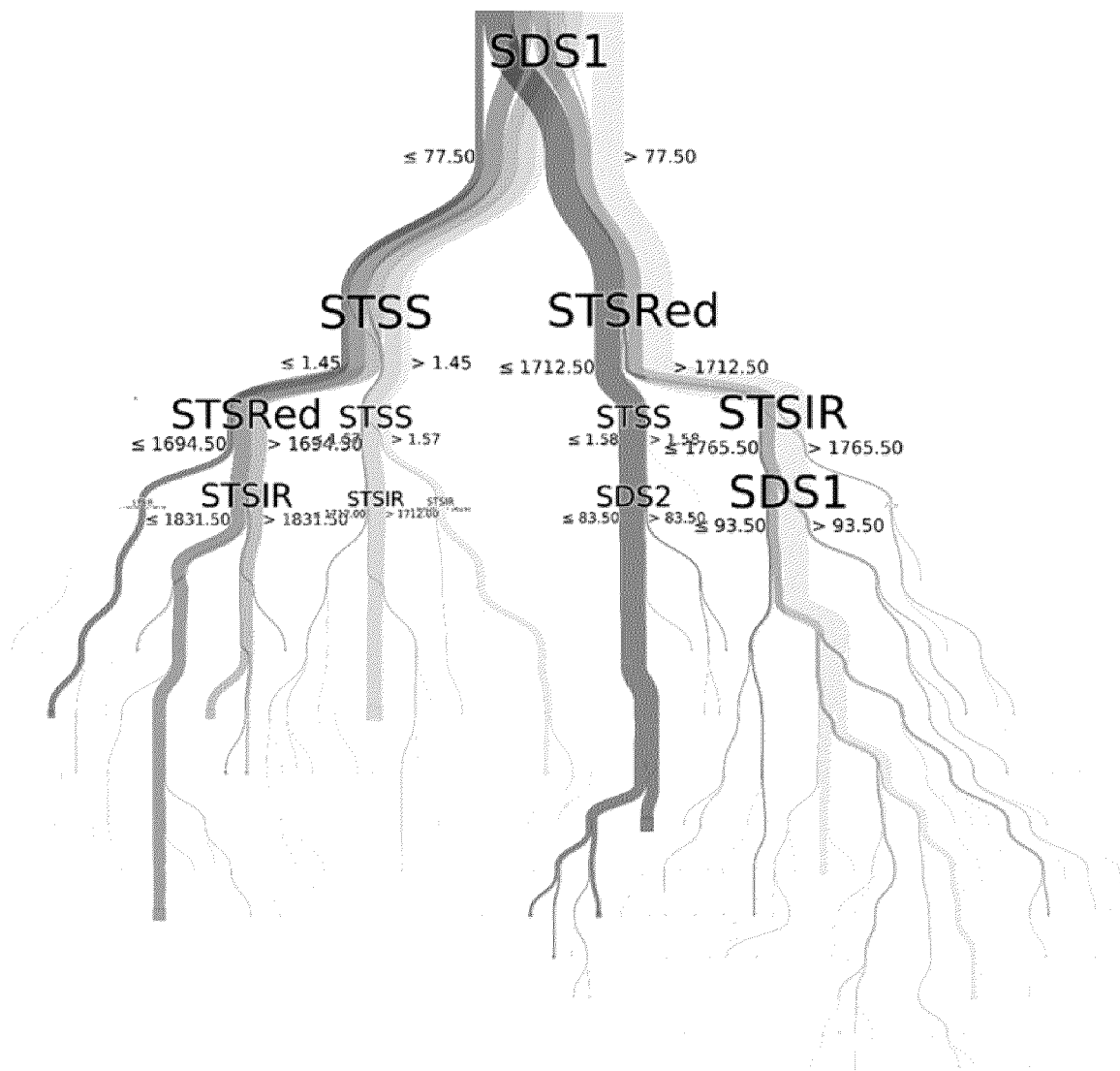
FIGS. 16 and 17 are visualizations of a decision tree for a personalised random forest model.
Figure 17:
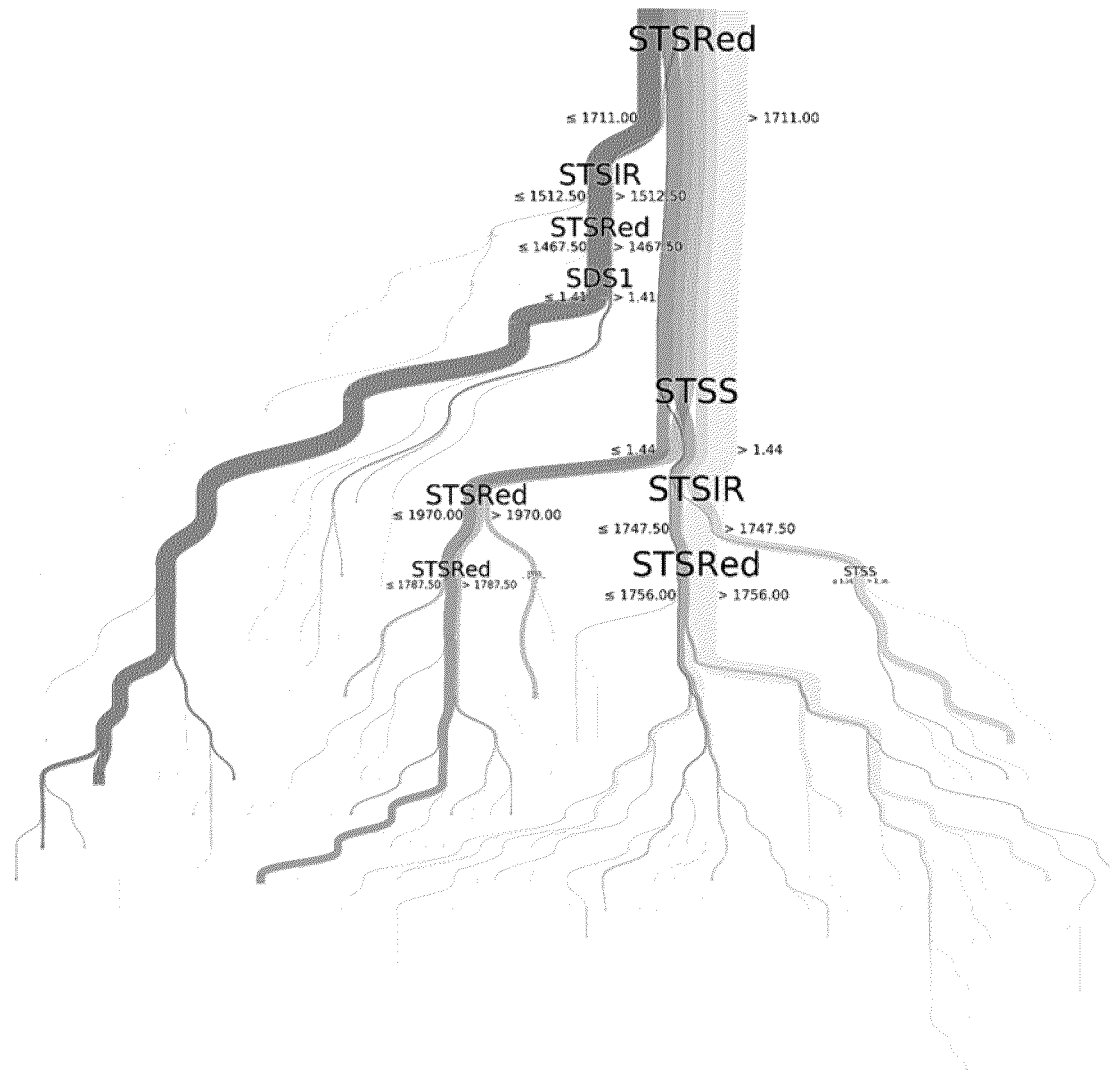

As noted above, it is possible to gain insight into the working principle of a random forest model by visualising its decision trees. FIGS. 16 and 17 show such visualisation of one of the decision trees for the personalised random forest models based on measurement signals from the skin contact sensors 14, 16 and the skin tone sensor 18. The exemplary decision tree in FIG. 16 is based on skin contact measurement signals that have not been corrected for variations in the sensor response due to the use of different attachments, whereas the exemplary decision tree in FIG. 17 is based on skin contact measurement signals that have been corrected for variations in the sensor response due to the use of different attachments. Each decision tree includes the decision nodes and corresponding features and feature values that are used to make classifier decisions. Thus, each node is labelled with a measurement signal (i.e. SDS1, SDS2, STSRed, STSIR or STSS) to indicate which measurement signal is assessed as part of that decision node, and a feature value or condition for a particular branch to be followed to the next node. For example, for the first node in FIG. 16, SDS1 is assessed, and if the value is greater than 77.50 the branch to the right is taken, and if the value is equal to or less than 77.50 then the branch to the left is taken. In FIGS. 16 and 17 the flow through the decision tree for each body part class (i.e. arm, leg, belly-bikini, etc.) is represented by a respective shade of grey.

As shown in FIG. 16, a first decision (at the top of the tree) is made based on the SDS1 signal. This decision mainly separates the classes arm, leg, and belly-bikini (which mainly progress down the right hand side of the decision tree) from the classes bikini-line, face and armpit (which mainly progress down the left hand side of the decision tree). It can be seen that after the first decision node, further classification is mainly based on the STS signals.

For the case with attachment correction of skin contact measurement signals in FIG. 17, it can be seen from the first 'layers' of decision nodes that classification is mainly based on the skin tone measurement signals (STSRed, STSIR and STSS).

Thus, in both examples, it can be seen that the random forest model primarily identifies the body part based on the skin tone measurement signals.

Figure 18:
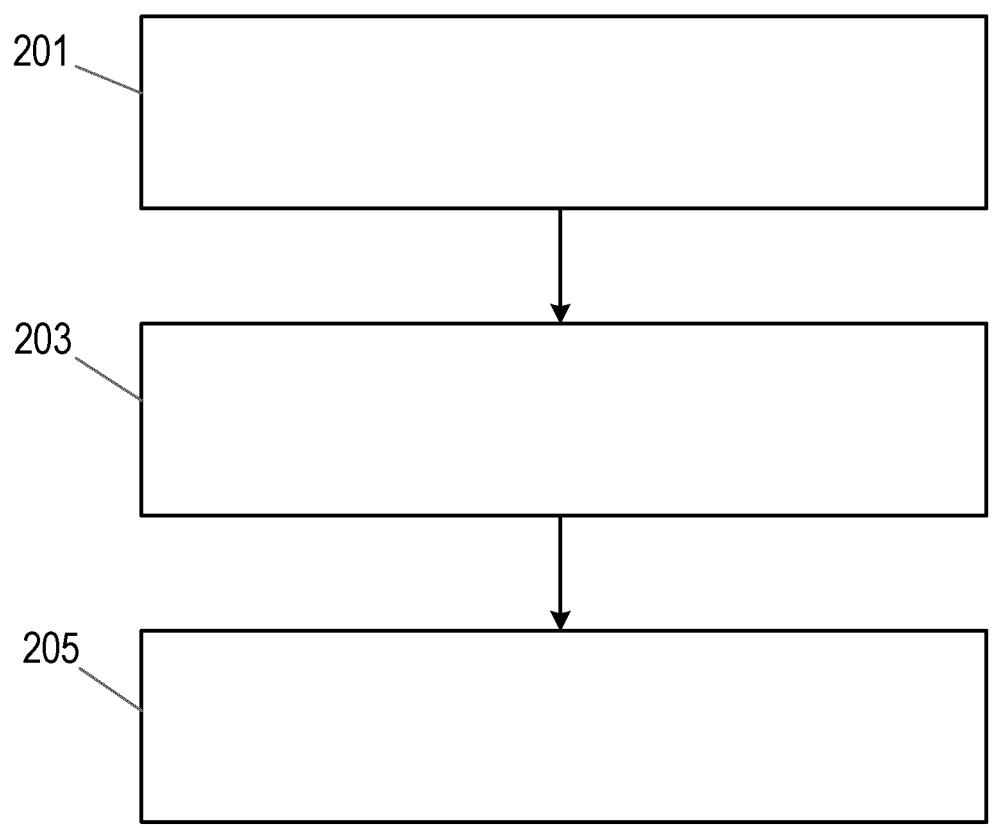
FIG. 18 is a flow chart illustrating an exemplary method of identifying a body part.

The flow chart in FIG. 18 illustrates an exemplary method according to the techniques described herein for identifying a body part that a hand-held device 2, 32 is being used on. One or more of the steps of the method can be performed by the processing unit 46 in the apparatus 44, in conjunction with either of the memory unit 48 and interface circuitry 50 of the apparatus 44, and/or the one or more sensors 52, as appropriate. The processing unit 46 may perform the one or more steps in response to executing computer program code that can be stored on a computer readable medium, such as, for example, the memory unit 48.

In step 201, the processing unit 44 obtains a respective measurement signal from each of the one or more sensors 52. As noted above, each sensor 52 measures a respective parameter as the hand-held device is used on the skin of the subject, and the sensor 52 generates a measurement signal comprising a time-series of measurements of the respective parameter. Also as noted above, the one or more sensors 52 comprises at least one of a skin contact sensor 14, 16, a skin tone sensor 18, and a proximity sensor 34.

In some embodiments, the one or more sensors 52 comprises at least a skin contact sensor 14, 16. In some embodiments, the one or more sensors 52 comprises at least a skin tone sensor 18. In some embodiments, the one or more sensors 52 comprises at least a proximity sensor 34. In some embodiments, the one or more sensors 52 comprises at least one skin contact sensor 14, 16 and a skin tone sensor 18. In some embodiments, the one or more sensors 52 comprises at least one skin contact sensor 14, 16, a skin tone sensor 18 and one or more proximity sensors 34. In some embodiments, the one or more sensors 52 comprises at least a plurality of proximity sensors 34. The plurality of proximity sensors 52 can be arranged in or on the hand-held device 2, 32 such that each proximity sensor 34 measures a distance from the proximity sensor 34 to a respective part of the skin adjacent to the skin that the head portion 6 is in contact with.

In an example, the proximity sensor 34 comprises a vertical-cavity surface-emitting laser (VCSEL) sensor. VCSEL sensors are known and used among others for distance and velocity measurement. They are applied in for example smartphones and computer input devices, for example a high-end optical computer mouse. The distance measurement can be based on a time-of-flight technique according to which a pulsed VCSEL is used as a light source and the distance is derived from the time between the light pulse emission by the light source and the detection of the reflected light by the sensor. Another technique is self-mixing interference (SMI), which relies on interference in the VCSEL laser cavity with coherent laser photons scattered back from the target. By specific modulation of the VCSEL driving current, velocity and distance of a target in the beam direction of the laser can be determined. In addition to the use of the distance measurements by the VCSEL sensors for body part detection as described in detail here before, the output signals of the VCSEL sensors can also be used for measurement of the displacement of the hand-held device 2, 32 with respect to the skin of the user. The displacement measurement enables guidance to the user during treatment in order to improve treatment coverage and to minimize missed treatment spots. For displacement measurement, the VCSEL sensors should typically be such that (quasi) 2D motion in the plane parallel to the treatment window of the hand-held device 2, 32 is optimally detected. Thus, the use of the VCSEL sensors allows the use of only a single type of sensor to enable both body part detection as well as displacement measurement.

Each measurement signal obtained in step 201 includes a plurality of measurements relating to the subject during a time window. In step 201, the processing unit 46 can obtain the measurement signal(s) directly from the respective sensor 52 or indirectly from the respective sensor 52 (e.g. via interface circuitry 50 and interface circuitry 54). In these embodiments the processing unit 46 may be able to process the measurement signal(s) or measurement samples as they are received (e.g. in real-time or near-real-time) to identify the body part that the hand-held device 2, 32 is in contact with in real time. Alternatively, the measurement signal(s) may have been obtained previously and stored in the memory unit 48, in which case in step 201 the processing unit 46 can retrieve the measurement signal(s) from the memory unit 48.

In step 203, the processing unit 46 analyses the one or more measurement signals obtained in step 201 using a trained MLM to identify the body part of the subject that the hand-held device 2, 32 is used on. The trained MLM is configured to analyse the plurality of measurements in the time window on each of the obtained one or more measurement signals to identify the body part.

In step 205, the processing unit 46 outputs an indication of the identified body part. For example the processing unit 46 can output the identity of the identified body part. The indication of the identified body part can be output by the processing unit 46 via a user interface, for example to a user or the subject, and/or the indication of the identified body part can be output by the processing unit 46 in the form of a signal via the interface circuitry 50 to another electronic device or apparatus, such as a computer, laptop, computer, server, etc., or even to the hand-held device 2, 32. In the latter case, the hand-held device 2, 32 may use the identity of the body part to adjust an operational parameter of the hand-held device 2, 32, such as a hair cutting/shaving length, a light pulse intensity, etc.

In various embodiments, the trained MLM can be a logistic regression model, a support vector machine, a random forest, a Naïve Bayes classifier, a nearest neighbour classifier, a decision tree classifier, an artificial neural network or a combination thereof.

It will be appreciated that the body parts that can be identified by the MLM will depend on the information (training data) used to train the MLM. As an example, the MLM may be able to identify the body part of the subject as any of a foot, a leg, a lower leg, an upper leg, a leg, abdomen, torso, chest, back, a hand, an arm, a lower arm, an upper arm, an armpit, a shoulder, neck, face, upper lip, scalp, or head. As another example, if the training data only included annotations for foot, leg, arm, abdomen, head, then the MLM can only provide an output indicating one of these body parts.

Step 203 can be repeated to provide further indications of the body part that the hand-held device 2, 32 is in contact with. The repetitions of step 203 can be based on further measurement sample(s) in the measurement signal(s) obtained in step 201 (in which case step 201 may not be repeated), or step 203 can be based on new measurements (e.g. newly obtained measurement signal(s), or newly obtained measurement sample(s) following a repetition of step 201).

In some embodiments, step 203 can be repeated for each measurement (measurement sample) in the obtained measurement signal(s) so that the MLM provides an indication of the body part for each measurement (measurement sample). In embodiments where the one or more sensors 52 comprises at least a skin contact sensor 14, 16, the trained MLM may only be used to identify the body part when the measurement signal from the skin contact sensor 14, 16 indicates that there is skin contact, e.g. when the magnitude of the parameter measured by the skin contact sensor 14, 16 is above a threshold. In that case, step 203 may only be performed if there is skin contact, or the measurement signal(s) may only be input to the MLM if there is skin contact.

In other embodiments, in step 203 (and repetitions of step 203) the trained MLM can identify the body part of the subject based on a temporal analysis of the measurement signal(s). In these embodiments, a portion of each of the measurement signal(s) (where a portion is more than one measurement sample per measurement signal) can be input to the MLM, and the MLM operates on the measurement samples in the portion. The portion can be determined by applying a sliding window to each measurement signal and the measurements (measurement samples) in the window are input to the MLM. The MLM outputs an indication of the identified body part for each set of measurements that are input to the MLM. For repetitions of step 203, the sliding window is moved across the measurement signal(s) (e.g. moved along by one or more samples) to identify a new set of measurement samples that are to be input into the MLM.

In the above embodiments, the portion of each measurement signal can be input directly into the MLM. In alternative embodiments, the portion(s) can be analysed to determine values for one or more features, and these feature values are input to the MLM in step 203. The features can be an average value of the parameter measured by the sensor 52, the standard deviation of the measured parameter per sensor 52, and/or other features relating to the statistical properties of the parameter that are each determined from the measurement samples in the sliding window.

In embodiments where step 203 is repeated to provide a series of outputs indicating an identified body part, the outputs can be 'smoothed' to improve the accuracy of the body part identification, i.e. spurious body part identifications can be filtered out. Thus in some embodiments a mode filter can be applied to the series of outputs from the MLM to determine the final output identified body part as the body part occurring most often in the set of outputs. In some embodiments, a sliding window can be applied to the set of outputs, and the mode filter can be applied to the outputs in the window.

In some embodiments, the MLM can be customised or calibrated to the subject by making use of measurement signal(s) from the one or more sensors 52 and annotations (confirmations) for the measurement signal(s) indicating the body part(s) that the hand-held device 2, 32 was used on. The MLM can be updated (trained) based on the annotations/confirmations and the relevant parts of the measurement signal(s).

In embodiments where the head portion 6 of the hand-held device 2, 32 can be selected from a set of removable head portions, the method can further comprise obtaining an indication of the removable head portion that was used on the hand-held device 2, 32 during the personal care operation, and this indication can be taken into account when analysing the measurement signal(s) to identify the body part. For example, if the performance of a sensor 52 varies between removable head portions, then the measurement signal(s) from that/those sensors 52 can be corrected for the variation before the measurement signal(s) are provided to the MLM for analysis. Alternatively, the MLM may have been trained with the identity of the removable head portion as an input, and so the indication of the identity of the removable head portion can be an input to the MLM along with the measurement signal(s) in step 203. As another alternative, the output of the MLM indicating a body part can be compared to the type of removable head portion being used on the hand-held device 2, 32. If there is a match, this can provide a higher confidence that the identified body part is correct. However, if there is a mismatch (e.g. the armpit attachment is being used but the body part identified by the MLM is the face), this can be indicated. In some cases this mismatch may be due to the user attaching the wrong attachment on the hand-held device 2, 32, and the correct attachment can be indicated to the user or subject.

In embodiments where the one or more sensors 52 comprises a skin contact sensor 14, 16 and at least one of a skin tone sensor 18 and a proximity sensor 34, step 203 can comprise analysing the measurement signal from the skin contact sensor 14, 16 to identify a contact time period in which the hand-held device 2, 32 is in contact with the skin. The hand-held device 2, 32 may be lifted off of the body when the hand-held device 2, 32 is moved between body parts, and so it can be assumed that between consecutive losses of skin contact, the hand-held device 2, 32 is used on the same body part. In that case, step 203 can comprise the MLM analysing the measurement signal(s) from the skin tone sensor 18 and/or the proximity sensor 34 for the identified contact time period to identify a single body part for the contact time period. In some embodiments, the contact time period can be identified as a time period in which the hand-held device 2, 32 is in continuous contact with the skin. Alternatively, the contact time period can be identified as a time period in which the hand-held device 2, 32 is in continuous contact with the skin, notwithstanding short losses of contact (e.g. of less than a threshold amount of time, e.g. less than 1 or 2 seconds). More specifically, the contact time period can be identified as spanning multiple time periods in each of which the hand-held device 2, 32 is in continuous contact with the skin, and the time gap between each consecutive pair of time periods is less than a threshold amount of time.

In embodiments where the hand-held device 2, 32 performs the personal care operation by using light pulses, the number of light pulses that have been applied to the body part can be recorded and used by the MLM to improve the body part identification. In particular, body parts such as legs, armpit, upper lip, arms, and bikini line, etc. have different surface areas and thus require a different amount of light pulses to treat, and so the number of light pulses can be used by the MLM an indicator of the body part.

The information on the identified body part can be used in a number of different ways. Some examples are provided below.

A personal care operation may need to be repeated on a regular basis, and the information on the treated body part(s) can be used to schedule and/or remind the subject when to retreat a particular body part, and the information on the subsequently treated body part(s) used to update the schedule.

Sub-optimal treatment results, for example due to poor coverage of the body part during a personal care operation, can negatively affect the subject's satisfaction with the hand-held device 2, 32. It is possible to provide feedback to the subject and/or user on the coverage of the body part based on the identified body part and other information such as a number of light pulses applied to the body part, or time spent treating the body part. This may reassure the subject that the hand-held device 2, 32 is being used correctly, or indicate that the body part should be treated for more or less time.

There is therefore provided improvements in identifying a body part that a hand-held device is being used on.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method of identifying a body part of a subject on which a hand-held device is used, wherein the hand-held device is for performing a personal care operation on the subject and the hand-held device comprises a head portion for contacting skin of the subject during the personal care operation, and wherein the hand-held device further comprises one or more sensors for measuring a respective parameter and generating respective measurement signals as the hand-held device is used on the skin of the subject, wherein the one or more sensors comprises at least one of:
   (a) a skin contact sensor, wherein the respective parameter measured by the skin contact sensor is indicative of whether the head portion is in contact with skin,
   (b) a skin tone sensor, wherein the respective parameter measured by the skin tone sensor is indicative of a skin tone of the skin that the head portion is in contact with, or indicative of a skin tone of adjacent skin that is adjacent to the skin that the head portion is in contact with, and
   (c) a proximity sensor, wherein the respective parameter measured by the proximity sensor is indicative of a distance from the proximity sensor to adjacent skin that is adjacent to the skin that the head portion is in contact with;
   wherein the method comprises:
      obtaining a respective one or more measurement signals from each of the one or more sensors, each measurement signal comprising a time-series of measurements of the respective parameter as the hand-held device is used on the skin of the subject;
      analyzing the obtained one or more measurement signals using a trained machine learning model (MLM) to identify the body part of the subject that the hand-held device is used on, wherein the trained MLM analyzes a plurality of measurements in a time window on each of the obtained one or more measurement signals to identify the body part; and
      outputting an indication of the identified body part.

2. The method as claimed in claim 1, wherein the trained MLM analyzes the measurements in each of the obtained measurement signals to identify the body part corresponding to said measurements.

3. The method as claimed in claim 1, wherein the method further comprises:
   repeating the step of analyzing on subsequent measurements in the one or more measurement signals to provide a series of outputs indicating the identified body part; and
   applying a filter to the series of outputs to determine a final output indicating the body part that the hand-held device was used on.

4. The method as claimed in claim 1, wherein the method further comprises:
   receiving confirmation from a user on the body part of the subject on which the hand-held device is used during a first time period; and
   updating the trained MLM based on the received confirmation and the obtained one or more measurement signals corresponding to the first time period.

5. The method as claimed in claim 1, wherein the head portion of the hand-held device is selected from a set of removable head portions, wherein each head portion in the set is for use with a respective body part or respective body parts, and wherein the method further comprises obtaining an indication of the removable head portion used on the hand-held device during the personal care operation, and wherein the trained MLM further analyzes the obtained indication with the obtained one or more measurement signals to identify the body part of the subject that the hand-held device is used on.

6. The method as claimed in claim 1, wherein the one or more sensors comprises the skin contact sensor and at least one of the skin tone sensor and the proximity sensor, wherein the step of analyzing comprises:

analyzing the measurement signal from the skin contact sensor to identify a contact time period in which the hand-held device is in contact with the skin; and analyzing the obtained one or more measurement signals from the at least one of the skin tone sensor and the proximity sensor for the identified contact time period using the trained MLM to identify the body part of the subject that the hand-held device is used on in the identified contact time period.

7. A non-transitory computer program product comprising a computer readable medium having computer readable code embodied therein, the computer readable code being configured such that, on execution by a suitable computer or processing unit, the computer or processing unit is caused to perform the method of claim 1.

8. A system comprising a hand-held device for performing a personal care operation on a subject and an apparatus for identifying a body part of the subject on which the hand-held device is used, wherein the hand-held device comprises a head portion for contacting skin of the subject during the personal care operation, and wherein the hand-held device further comprises one or more sensors for measuring a respective parameter and generating respective measurement signals as the hand-held device is used on the skin of the subject, wherein the one or more sensors comprises at least one of:

(a) a skin contact sensor, wherein the respective parameter measured by the skin contact sensor is indicative of whether the head portion is in contact with skin, (b) a skin tone sensor, wherein the respective parameter measured by the skin tone sensor is indicative of a skin tone of the skin that the head portion is in contact with, or indicative of a skin tone of adjacent skin that is adjacent to the skin that the head portion is in contact with, and (c) a proximity sensor, wherein the respective parameter measured by the proximity sensor is indicative of a distance from the proximity sensor to adjacent skin that is adjacent to the skin that the head portion is in contact with;

wherein the apparatus comprises a processing unit configured to:

obtain a respective one or more measurement signals from each of the one or more sensors, each measurement signal comprising a time-series of measurements of the respective parameter as the hand-held device is used on the skin of the subject;

analyze the obtained one or more measurement signals using a trained machine learning model, MLM, to identify the body part of the subject that the hand-held device is used on, wherein the trained MLM is configured to analyze a plurality of measurements in a time window on each of the obtained one or more measurement signals to identify the body part; and output an indication of the identified body part.

9. The system as claimed in claim 8, wherein the trained MLM analyzes measurements in each of the obtained measurement signals to identify the body part corresponding to said measurements.

10. The system as claimed in claim 8, wherein the processing unit is further configured to:

repeat the analysis on subsequent measurements in the one or more measurement signals to provide a series of outputs indicating the identified body part; and apply a filter to the series of outputs to determine a final output indicating the body part that the hand-held device was used on.

11. The system as claimed in claim 8, wherein the processing unit is further configured to:

receive confirmation from a user on the body part of the subject on which the hand-held device is used during a first time period; and update the trained MLM based on the received confirmation and the obtained one or more measurement signals corresponding to the first time period.

12. The system as claimed in claim 8, wherein the head portion of the hand-held device is selected from a set of removable head portions, wherein each head portion in the set is for use with a respective body part or respective body parts, and wherein the processing unit is further configured to obtain an indication of the removable head portion used on the hand-held device during the personal care operation, and wherein the processing unit is configured to analyze the obtained indication with the obtained one or more measurement signals using the trained MLM to identify the body part of the subject that the hand-held device is used on.

13. The system as claimed in claim 8, wherein the hand-held device comprises the apparatus for identifying the body part.

14. The system as claimed in claim 8, wherein the apparatus for identifying the body part is separate from the hand-held device.

15. The system as claimed in claim 8, wherein the one or more sensors comprises the proximity sensor and the proximity sensor comprises a vertical-cavity surface-emitting laser (VCSEL) sensor.

* * * * *